US009919758B2

(12) United States Patent
Takano

(10) Patent No.: US 9,919,758 B2
(45) Date of Patent: *Mar. 20, 2018

(54) VEHICLE

(71) Applicant: YAMAHA HATSUDOKI KABUSHIKI KAISHA, Iwata-shi, Shizuoka (JP)

(72) Inventor: Kazuhisa Takano, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/896,199

(22) PCT Filed: Jan. 30, 2015

(86) PCT No.: PCT/JP2015/000412
§ 371 (c)(1),
(2) Date: Dec. 4, 2015

(87) PCT Pub. No.: WO2015/115109
PCT Pub. Date: Aug. 6, 2015

(65) Prior Publication Data
US 2016/0114850 A1   Apr. 28, 2016

(30) Foreign Application Priority Data

Jan. 31, 2014   (JP) .................................. 2014-017268

(51) Int. Cl.
*B62K 5/027* (2013.01)
*B62J 35/00* (2006.01)
(Continued)

(52) U.S. Cl.
CPC ............... *B62K 5/027* (2013.01); *B62J 35/00* (2013.01); *B62K 5/05* (2013.01); *B62K 5/08* (2013.01); *B62K 5/10* (2013.01); *B62K 11/04* (2013.01)

(58) Field of Classification Search
CPC . B62K 5/027; B62K 5/05; B62K 5/06; B62K 5/08; B62K 5/10; B62K 11/02;
(Continued)

(56) References Cited

U.S. PATENT DOCUMENTS 4,719,984 A  *  1/1988  Watanabe ............... B60T 1/062
                                                   180/215
4,781,258 A  *  11/1988  Tamura .................. B60K 11/06
                                                   180/229
(Continued)

FOREIGN PATENT DOCUMENTS

CN          202414056 U      9/2012
DE     10 2010 052 716 A1    6/2011
(Continued)

OTHER PUBLICATIONS

Official Communication issued in International Patent Application No. PCT/JP2015/000412, dated Apr. 21, 2015.
(Continued)

*Primary Examiner* — Barry Gooden, Jr.
(74) *Attorney, Agent, or Firm* — Keating and Bennett, LLP

(57) ABSTRACT

A vehicle includes a left front wheel and a right front wheel that tilt together with a body frame, and a rear wheel that tilts together with the body frame, wherein, while a large capacity of a fuel tank is ensured, a variation in the center-of-gravity position while driving is small. When the body frame is in an upright position, the fuel tank is disposed between extensions of the upper axis and lower axis of a linkage mechanism such that the fuel tank is disposed between the center of the area between the center of the area between a right front wheel ground contact portion where the right front wheel comes into contact with the ground, a left front wheel ground contact portion where the left front wheel comes into contact with the ground, and a rear wheel ground
(Continued)

contact portion where the rear wheel comes into contact with the ground, and the right and left front wheel ground contact portions; and the center of the area between the center of the area between right front wheel ground contact portion, the left front wheel ground contact portion, and the rear wheel ground contact portion, and the rear wheel ground contact portion.

8 Claims, 13 Drawing Sheets

(51) Int. Cl.
  *B62K 5/05* (2013.01)
  *B62K 5/08* (2006.01)
  *B62K 5/10* (2013.01)
  *B62K 11/04* (2006.01)

(58) Field of Classification Search
  CPC .... B62K 11/04; B62J 35/00; B60G 2300/122; B62D 9/02
  See application file for complete search history.

(56) References Cited

U.S. PATENT DOCUMENTS

| | | | | |
|---|---|---|---|---|
| 4,787,470 | A * | 11/1988 | Badsey | B62D 61/065 180/210 |
| 4,826,057 | A * | 5/1989 | Yamada | B62K 5/027 180/215 |
| 5,094,315 | A * | 3/1992 | Taki | B62K 19/46 180/219 |
| 6,763,905 | B2 * | 7/2004 | Cocco | B60G 21/007 180/210 |
| D547,242 | S | 7/2007 | Lambri | |
| 7,243,765 | B2 * | 7/2007 | Marcacci | B60G 15/063 188/300 |
| 7,264,251 | B2 * | 9/2007 | Marcacci | B60G 17/0152 280/124.103 |
| 7,648,148 | B1 * | 1/2010 | Mercier | B60G 21/007 180/210 |
| 8,991,542 | B2 * | 3/2015 | Yu | B62K 5/027 180/209 |
| 2002/0007977 | A1 * | 1/2002 | Ishii | B62J 17/00 180/219 |
| 2002/0190494 | A1 * | 12/2002 | Cocco | B60G 21/007 280/124.135 |
| 2004/0227321 | A1 * | 11/2004 | Kuroki | B60G 3/02 280/124.135 |
| 2005/0012291 | A1 * | 1/2005 | Bagnoli | B62K 5/05 280/124.103 |
| 2005/0167174 | A1 | 8/2005 | Marcacci | |
| 2005/0167217 | A1 * | 8/2005 | Marcacci | B60G 15/063 188/300 |
| 2006/0065456 | A1 * | 3/2006 | Noda | B62K 11/04 180/219 |
| 2007/0075517 | A1 * | 4/2007 | Suhre | B60G 3/20 280/124.134 |
| 2007/0199761 | A1 * | 8/2007 | Seki | B62K 5/027 180/312 |
| 2007/0262548 | A1 * | 11/2007 | Rawlinson | B60G 21/007 280/124.103 |
| 2009/0107754 | A1 * | 4/2009 | Doperalski | B62K 5/027 180/337 |
| 2010/0147615 | A1 * | 6/2010 | Tsujii | B60G 3/145 180/215 |
| 2013/0168944 | A1 | 7/2013 | Bartolozzi et al. | |
| 2014/0204598 | A1 * | 7/2014 | Di Tanna | B60Q 1/12 362/460 |
| 2014/0375015 | A1 | 12/2014 | Yu | |
| 2015/0158540 | A1 * | 6/2015 | Hara | B62K 11/10 180/219 |
| 2015/0166139 | A1 * | 6/2015 | Inomori | B62K 11/04 180/219 |
| 2016/0056482 | A1 * | 2/2016 | Otsuka | B60L 11/1898 180/220 |
| 2016/0090141 | A1 * | 3/2016 | Mizukura | B62J 35/00 180/219 |
| 2016/0107713 | A1 * | 4/2016 | Takano | B62K 5/027 180/210 |

FOREIGN PATENT DOCUMENTS

| | | |
|---|---|---|
| EP | 2 368 729 A1 | 9/2011 |
| JP | 59-149874 A | 8/1984 |
| JP | 6-61680 U | 8/1994 |
| JP | 2005-313876 A | 11/2005 |
| JP | 2010-36791 A | 2/2010 |
| JP | 2011-195100 A | 10/2011 |
| TW | 201210882 A1 | 3/2012 |
| WO | 2012/007819 A1 | 1/2012 |

OTHER PUBLICATIONS

Piaggio, "Catalogo Parti Di Ricambio", NTRC000U05, MP3 300 ie LT Touring 2011-2013, ZAPM64102, Nov. 13, 2013, pp. 1-92.

* cited by examiner

VEHICLE

BACKGROUND OF THE INVENTION

1. Field of the Invention

The present invention relates to a vehicle including a body frame that tilts in a left-right direction of the vehicle during left and right turns, a left front wheel and a right front wheel that are disposed side by side in the left-right direction and that tilt (hereinafter, referred to as "tiltable") along with the body frame during left and right turns, and a rear wheel that tilts along with the body frame.

2. Description of the Related Art

A vehicle including a body frame that tilts in a left-right direction of the vehicle during left and right turns, and two front wheels disposed side by side in the left-right direction of the body frame is known (for example, see Japanese Patent Application Laid-Open No. 2005-313876; U.S. Design Pat. No. D547,242S; and Catalogo parti di ricambio, MP3 300 ie LT Mod. ZAPM64102, Piaggio & C. pp. 76-80). This type of vehicle can turn while the body frame tilts relative to a vertical direction. More specifically, the body frame tilts to the right of the vehicle during a right turn and to the left of the vehicle during a left turn.

The vehicles described in Japanese Patent Application Laid-Open No. 2005-313876; U.S. Design Pat. No. D547,242S; and Catalogo parti di ricambio include link mechanisms. The link mechanisms each include an upper cross member and a lower cross member. The link mechanism also includes a right-side rod that supports right end portions of the upper cross member and the lower cross member, and a left-side rod that supports left end portions of the upper cross member and the lower cross member. An intermediate portion of the upper cross member and the lower cross member is supported by the body frame. The upper cross member and the lower cross member are supported by the body frame so as to be capable of turning (hereinafter, referred to as "turnable") around an axis extending substantially in the front-rear direction of the body frame. The upper cross member and the lower cross member turn relative to the body frame in conjunction with tilting of the body frame, and the relative position of the left front wheel and the right front wheel in the up-down direction of the body frame changes. The upper cross member and the lower cross member are disposed above the left front wheel and the right front wheel in the up-down direction of the body frame, when the body frame is in an upright state.

In the conventional vehicle disclosed in Catalogo parti di ricambio, a fuel tank is disposed in a center tunnel positioned between floor portions on which the rider puts his or her left and right feet (for example, see P 76 to P 80 of Catalogo parti di ricambio and FIG. 3 of U.S. Design Pat. No. D547,242S).

The weight of the fuel tank changes depending on the remaining fuel. Therefore, the center of gravity of the vehicle changes depending on the remaining fuel during the operation of vehicle.

Meanwhile, downsizing the fuel tank to reduce the weight variation of the fuel tank causes a reduction in the capacity of the fuel tank.

SUMMARY OF THE INVENTION

Preferred embodiments of the present invention provide a vehicle including a left front wheel and a right front wheel that tilt along with a body frame, and a rear wheel that tilts along with the body frame, wherein an amount of change in the center of gravity of the vehicle during the operation of vehicle is small while a large capacity of the fuel tank is ensured.

A vehicle according to a preferred embodiment of the present invention includes a body frame; a right front wheel and a left front wheel disposed side by side in a left-right direction of the body frame, the right and the left front wheels being tiltable in a left-right direction of the vehicle along with the body frame; a rear wheel being tiltable in the left-right direction of the vehicle along with the body frame; a seat including a seating surface on which a rider sits; a right-front-wheel support including an upper portion and a lower portion that supports the right front wheel; a left-front-wheel support including an upper portion and a lower portion that supports the left front wheel; a link mechanism including a right-side rod that supports the upper portion of the right-front-wheel support such that the upper portion thereof is turnable around a right axis extending in an up-down direction of the body frame, a left-side rod that supports the upper portion of the left-front-wheel support unit such that the upper portion thereof is turnable around a left axis which is parallel or substantially parallel to the right axis, an upper cross member including a right end portion that supports an upper portion of the right-side rod such that the upper portion thereof is turnable, a left end portion that supports an upper portion of the left-side rod such that the upper portion thereof is turnable, and an intermediate portion that is supported by the body frame so as to be turnable around an upper axis extending in a front-rear direction of the body frame, and a lower cross member including a right end portion that supports a lower portion of the right-side rod such that the lower portion thereof is turnable, a left end portion that supports a lower portion of the left-side rod such that the lower portion thereof is turnable, and an intermediate portion that is supported by the body frame so as to be turnable around a lower axis which is parallel or substantially parallel to the upper axis, a power unit including a crankcase that houses a crankshaft, and a transmission case housing a transmission mechanism, the power unit generating a driving force of the rear wheel; a fuel tank that stores fuel to be supplied to the power unit; and a steering shaft supported by the body frame so as to be turnable, the steering shaft changing a direction of the left front wheel and the right front wheel, in which the link mechanism is disposed above the right front wheel and the left front wheel in a side view with the body frame in an upright state, in which an angle defined by a vertical line and a virtual line that is perpendicular or substantially perpendicular to the upper axis and the lower axis is smaller than an angle defined by a turning axis of the steering shaft and the vertical line in a side view with the body frame in the upright state, the crankcase is disposed below upper ends of the right front wheel, the left front wheel, and the rear wheel in the up-down direction of the body frame and between the right and the left front wheels, and the rear wheel in the front-rear direction of the body frame with the body frame in the upright state, and the crankcase and the transmission case are disposed closer to the rear wheel than to the right and the left front wheels in the front-rear direction of the body frame with the body frame in the upright state, the seating surface is disposed between front ends of the crankcase and the transmission case and a rear end of the rear wheel in the front-rear direction of the body frame with the body frame in the upright state, and the fuel tank is disposed between an extension line of the upper axis and an extension line of the lower axis in the up-down direction of the body frame with the body frame in the upright state, and is disposed between a first center and a second center, the first center being located between a third center and right and left front wheel ground contacting portions, the second center being located between the third center and a rear wheel ground contacting portion, the third center being located between the right and the left front wheel ground contacting portions and the rear wheel ground contacting portion in the front-rear direction of the body frame with the body frame in the upright state, the right front wheel ground contacting portion, the left front wheel ground contacting portion, and the rear wheel ground contacting portion being where the right front wheel, the left front wheel, and the rear wheel contact the ground, respectively.

According to a preferred embodiment of the present invention, the heavy link mechanism, the heavy power unit, and the heavy seat on which the rider sits are disposed in a relationship described above. In this relationship, the fuel tank in which the weight changes depending on the remaining fuel is disposed between the extension line of the upper axis and the extension line of the lower axis in the up-down direction of the body frame and is disposed between the center between the center of the right and left front wheel ground contacting portions and the rear wheel ground contacting portion and the right front wheel ground contacting portion and the left front wheel ground contacting portion; and the center between the center of the left and right front wheel ground contacting portions and the rear wheel ground contacting portion and the rear wheel ground contacting portion in the front-rear direction of the body frame. The angle defined by the virtual line, which is perpendicular or substantially perpendicular to the upper axis and the lower axis, and the virtual line, is smaller than the angle defined by the turning axis of the steering shaft and the vertical line in a side view with the body frame in the upright state. Therefore, the fuel tank is located between the upper axis and the lower axis to dispose the fuel tank near the center of gravity. According to this configuration, the fuel tank is disposed near the center of gravity of the vehicle with the rider on the vehicle. A vehicle with a small amount of change in the center of gravity based on the remaining fuel is provided by disposing the fuel tank near the center of gravity of the vehicle with the rider on the vehicle. Therefore, the configuration described above provides a vehicle with a small amount of change in the center of gravity during operation while ensuring a large capacity of the fuel tank.

Preferred embodiments of the present invention may also include the following aspects.

A vehicle according to a second aspect of various preferred embodiments of the present invention includes a left end of the fuel tank disposed on the left of a center between a center of the upper cross member and the lower cross member and left ends of the upper cross member and the lower cross member, and a right end of the fuel tank disposed on the right of a center between the center of the upper cross member and the lower cross member and right ends of the upper cross member and the lower cross member in the left-right direction of the body frame with the body frame in the upright state.

In the vehicle of the second aspect, the front portion of the vehicle has a vehicle width that allows the left front wheel and the right front wheel to be disposed side by side in the left-right direction. Therefore, the fuel tank with a large width is easily mounted on the vehicle. According to the vehicle of the second aspect, the left end of the fuel tank is disposed on the left of the center between the center of the upper cross member and the lower cross member and the left ends of the upper cross member and the lower cross member. The right end of the fuel tank is disposed on the right of the center between the center of the upper cross member and the lower cross member and the right ends of the upper cross member and the lower cross member. Therefore, the width of the fuel tank in the left-right direction increases. This reduces the height of the fuel tank while ensuring a large capacity of the fuel tank. As a result, a vehicle is provided with a small amount of change in the center of gravity based on the remaining fuel during operation, while a large capacity of the fuel tank is ensured.

A vehicle according to a third aspect of various preferred embodiments of the present invention includes a rear end of the fuel tank disposed forward of the third center being located between the left and the right front wheel ground contacting portions and the rear wheel ground contacting portion in the front-rear direction of the body frame with the body frame in the upright state.

According to the vehicle of the third aspect, the rear end of the fuel tank is disposed forward of the center of the left and right front wheel ground contacting portions and the rear wheel ground contacting portion in the front-rear direction of the body frame with the body frame in the upright state, between the extension line of the upper axis and the extension line of the lower axis in the up-down direction of the body frame. Therefore, the fuel tank is disposed at a high position close to the center of gravity of the vehicle with the rider on the vehicle. The angle defined by the virtual line, which is perpendicular or substantially perpendicular to the upper axis and the lower axis, and the vertical line, is smaller than the angle defined by the turning axis of the steering shaft and the vertical line in a side view with the body frame in the upright state. Therefore, the movable range of the link mechanism in the front-rear direction of the body frame associated with tilting of the vehicle is small. This reduces or prevents a reduction in the capacity of the fuel tank even if the rear end of the fuel tank is disposed forward of the center of the left and right front wheel ground contacting portions and the rear wheel ground contacting portion.

Therefore, a vehicle is provided with a small amount of change in the center of gravity based on the remaining fuel during operation, while a large capacity of the fuel tank is ensured.

A vehicle according to a fourth aspect of various preferred embodiments of the present invention includes a front end of the fuel tank disposed behind the third center located between the left and the right front wheel ground contacting portions and the rear wheel ground contacting portion in the front-rear direction of the body frame with the body frame in the upright state.

According to the vehicle of the fourth aspect, the rear end of the fuel tank is disposed behind the center of the left and right front wheel ground contacting portions and the rear wheel ground contacting portion in the front-rear direction of the body frame with the body frame in the upright state. Therefore, the fuel tank is disposed at a low position close to the center of gravity of the vehicle with the rider on the vehicle. As a result, a vehicle is provided with a small amount of change in the center of gravity based on the remaining fuel during operation.

Therefore, a vehicle is provided with a small amount of change in the center of gravity based on the remaining fuel during operation, while a large capacity of the fuel tank is ensured.

A vehicle according to a fifth aspect of various preferred embodiments of the present invention includes the fuel tank overlapping with the third center located between the left and the right front wheel ground contacting portions and the rear wheel ground contacting portion in the front-rear direction of the body frame with the body frame in the upright state.

According to the vehicle of the fifth aspect, the fuel tank overlaps with the center of the left and right front wheel ground contacting portions and the rear wheel ground contacting portion. Therefore, a large capacity of the fuel tank is easily ensured, while the fuel tank is disposed closer to the center of gravity of the vehicle with the rider on the vehicle.

As a result, a vehicle is provided with a small amount of change in the center of gravity based on the remaining fuel during operation, while a large capacity of the fuel tank is ensured.

A vehicle according to a sixth aspect of various preferred embodiments of the present invention includes an upper end of the fuel tank disposed above a lower end of the lower cross member in the up-down direction of the body frame.

According to the vehicle of the sixth aspect, the fuel tank is closer to the center of gravity of the vehicle with the rider on the vehicle. Therefore, a vehicle is provided with a small amount of change in the center of gravity of the vehicle during operation.

A vehicle according to a seventh aspect of various preferred embodiments of the present invention includes a component including a battery or a brake pressure controller, in which the component is disposed between the extension line of the upper axis and the extension line of the lower axis in the up-down direction of the body frame with the body frame in the upright state, and is disposed between the first center and the second center.

According to the vehicle of the seventh aspect, a heavy component is disposed near the center of gravity of the vehicle with the rider on the vehicle.

Preferred embodiments of the present invention provide a vehicle including a left front wheel and a right front wheel that are tiltable along with a body frame; and a rear wheel that is tiltable along with the body frame, in which the amount of change in the center of gravity during operation is small, while a large capacity of a fuel tank is ensured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the accompanying drawings.

Figure 9:
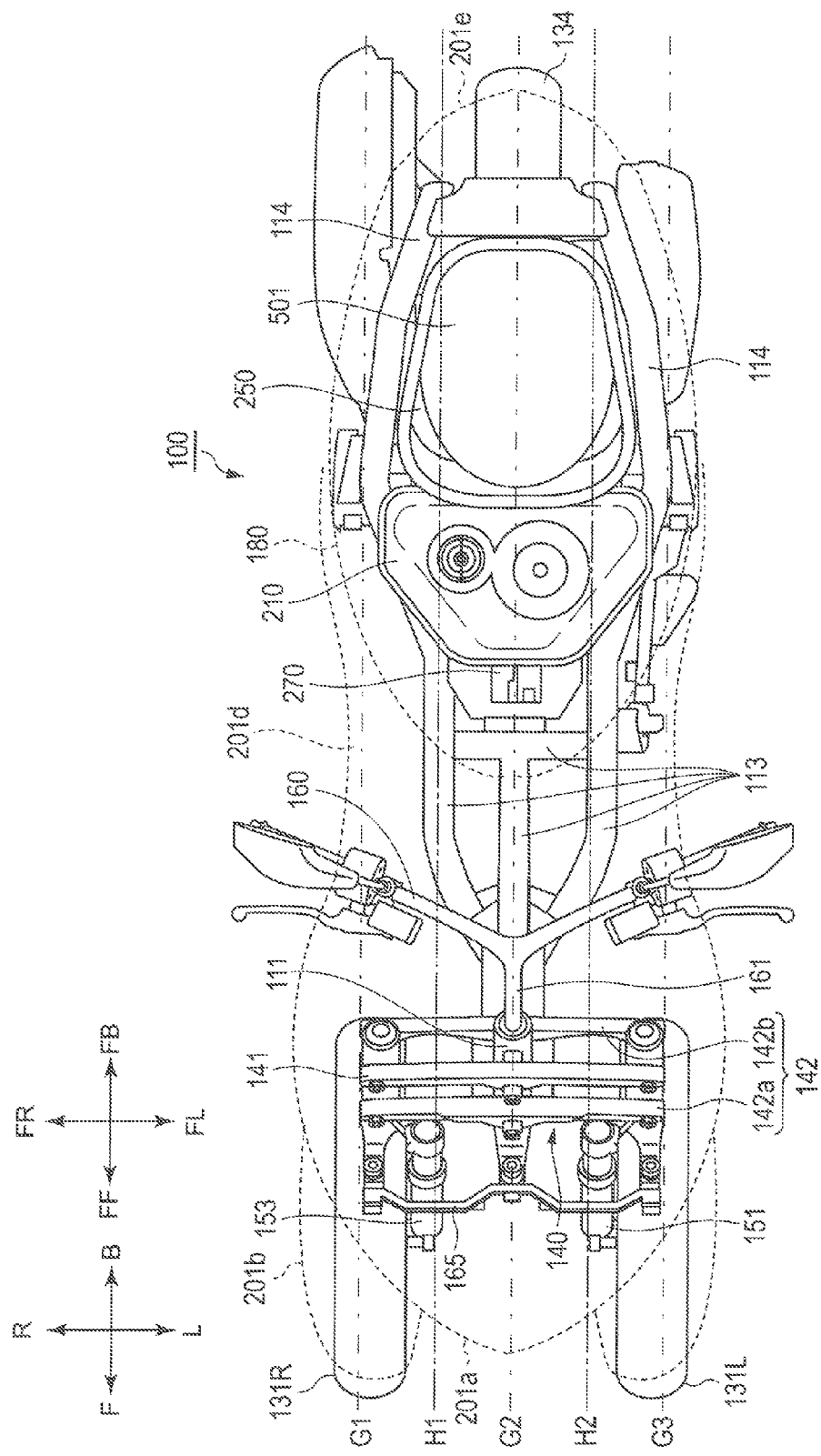
FIG. 9 is a plan view showing the disposition of the fuel tank.

In the accompanying drawings, arrow F denotes a front direction of vehicle 100, and arrow B denotes a rear (or back) direction of vehicle 100. Arrow U denotes an upward direction of vehicle 100, and arrow D denotes a downward direction of vehicle 100. Arrow R denotes a right direction of vehicle 100, and arrow L denotes a left direction of vehicle 100. Body frame 110 tilts in a left-right direction of vehicle 100 relative to a vertical line to turn vehicle 100. Therefore, in addition to the directions of vehicle 100, directions based on body frame 110 are defined. Arrow FF in the accompanying drawings denotes a front direction based on body frame 110, and arrow FB denotes a rear direction based on body frame 110. Arrow FU denotes an upward direction based on body frame 110, and arrow FD denotes a downward direction based on body frame 110. Arrow FR denotes a right direction based on body frame 110, and arrow FL denotes a left direction based on body frame 110. In the description, a front-rear direction of vehicle 100, an up-down direction of vehicle 100, and the left-right direction of vehicle 100 denote front-rear, up-down, and left-right directions as viewed from a rider driving vehicle 100 and are directions based on vehicle 100. In this description, a front-rear direction of body frame 110, an up-down direction of body frame 110, and a left-right direction of body frame 110 are front-rear, up-down, and left-right directions as viewed from the rider driving vehicle 100 and are directions based on body frame 110. A center in a vehicle width direction denotes a center of the vehicle width in the left-right direction of vehicle 100. In other words, the center in the vehicle width direction denotes a center in the left-right direction of vehicle 100. In this description, an upright state denotes a state in which the up-down direction of body frame 110 coincides with the vertical line, and handlebar 160 is not steered. The state in which handlebar 160 is not steered denotes a state in which rotation axes of left front wheel 131L and right front wheel 131R are orthogonal to the front-rear direction of body frame 110 in a plan view. In other words, the state in which handlebar 160 is not steered is a state in which steering shaft 161 is not turned or a state in which handlebar 160 is not turned as shown in FIG. 9. In the upright state, the direction of vehicle 100 coincides with the direction of body frame 110. When body frame 110 tilts in the left-right direction relative to the vertical direction to turn vehicle 100, the left-right direction of vehicle 100 does not coincide with the left-right direction of body frame 110. The up-down direction of vehicle 100 does not coincide with the up-down direction of body frame 110, either. However, the front-rear direction of vehicle 100 coincides with the front-rear direction of body frame 110.

In the present description, an axis extending in the front-rear direction denotes not only an axis parallel or substantially parallel to the front-rear direction of body frame 110, but also includes an axis tilted in a range of ±45 degrees relative to the front-rear direction of body frame 110. An axis extending in a direction closer to the front-rear direction than to the left-right direction and the up-down direction is included in the axis extending in the front-rear direction. Similarly, an axis extending in the up-down direction includes an axis tilted in a range of ±45 degrees relative to the up-down direction of body frame 110. An axis extending in a direction closer to the up-down direction than to the front-rear direction and the left-right direction is included in the axis extending in the up-down direction. An axis extending in the left-right direction includes an axis tilted in a range of ±45 degrees relative to the left-right direction of body frame 110. An axis extending in a direction closer to the left-right direction than to the front-rear direction and the up-down direction is included in the axis extending in the left-right direction.

In the present description, when it is mentioned that a portion of body frame 110 "extends in the front-rear direction", it is only necessary that the extending direction includes a component of body frame 110 in the front-rear direction, and this includes a mode in which the portion extends in an oblique front-rear direction inclined up, down, left, or right.

Figure 1:
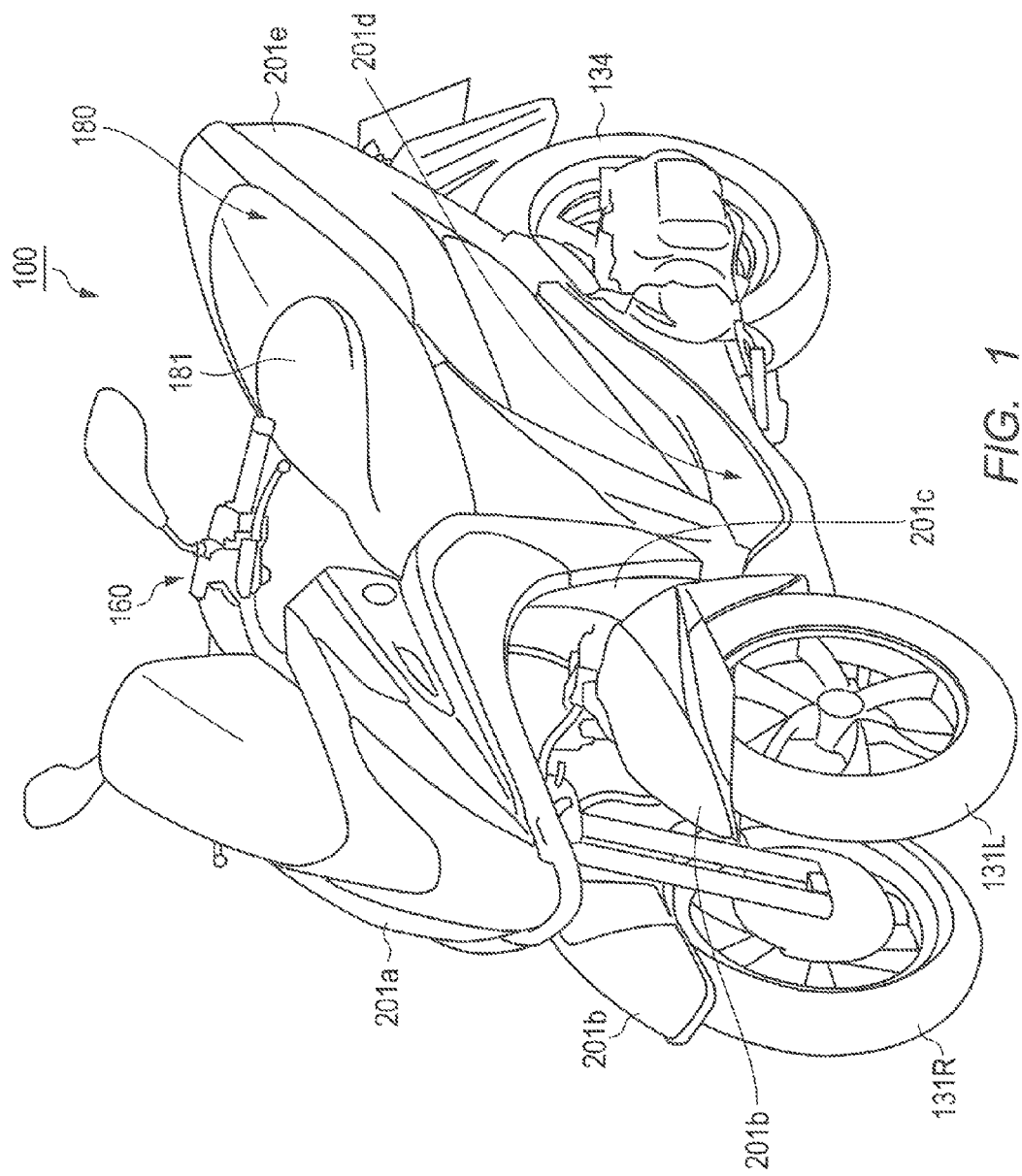
FIG. 1 is a perspective view showing a vehicle according to a preferred embodiment of the present invention.
Figure 2:
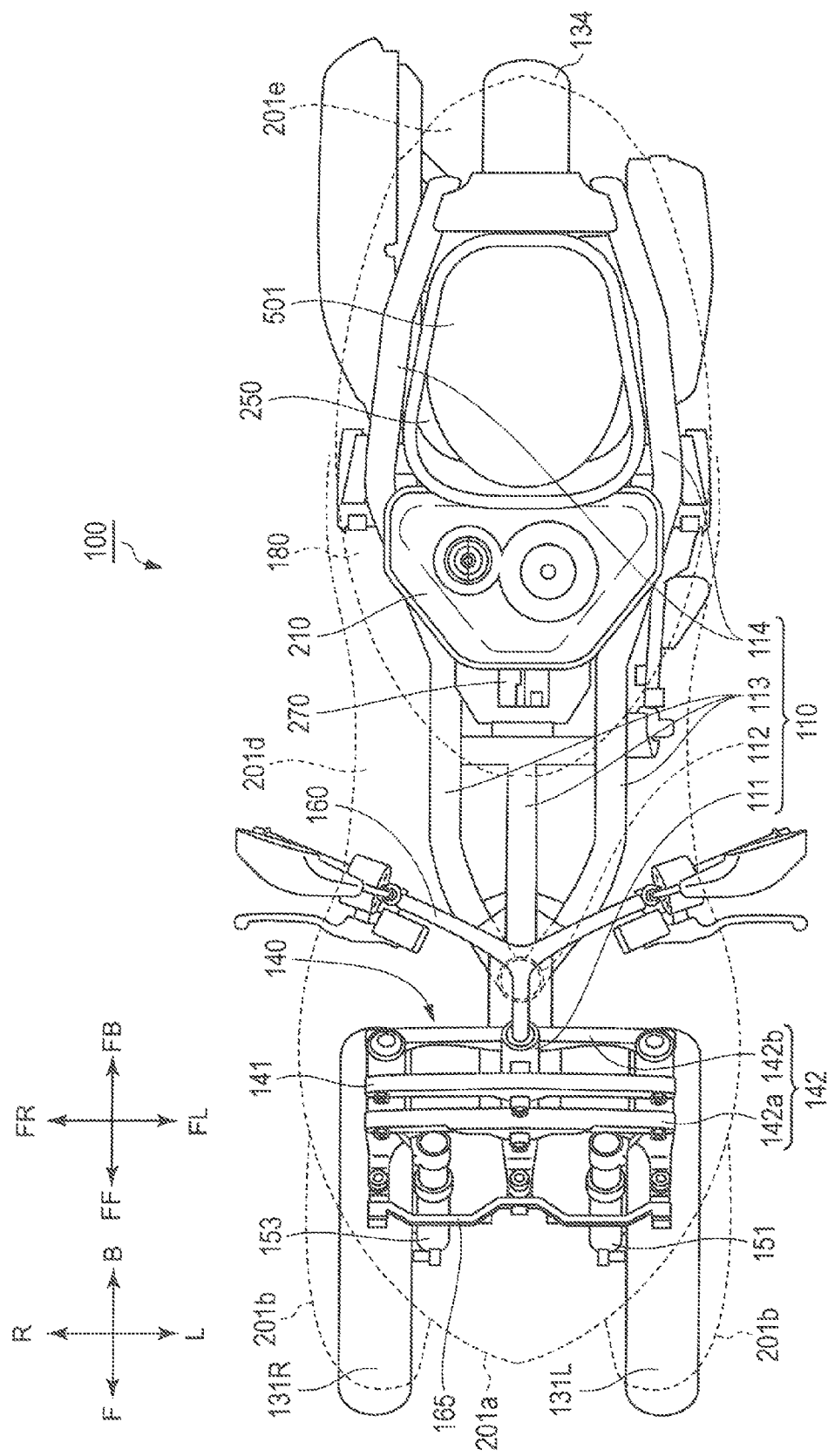
FIG. 2 is a plan view showing the vehicle with an exterior removed.
Figure 3:
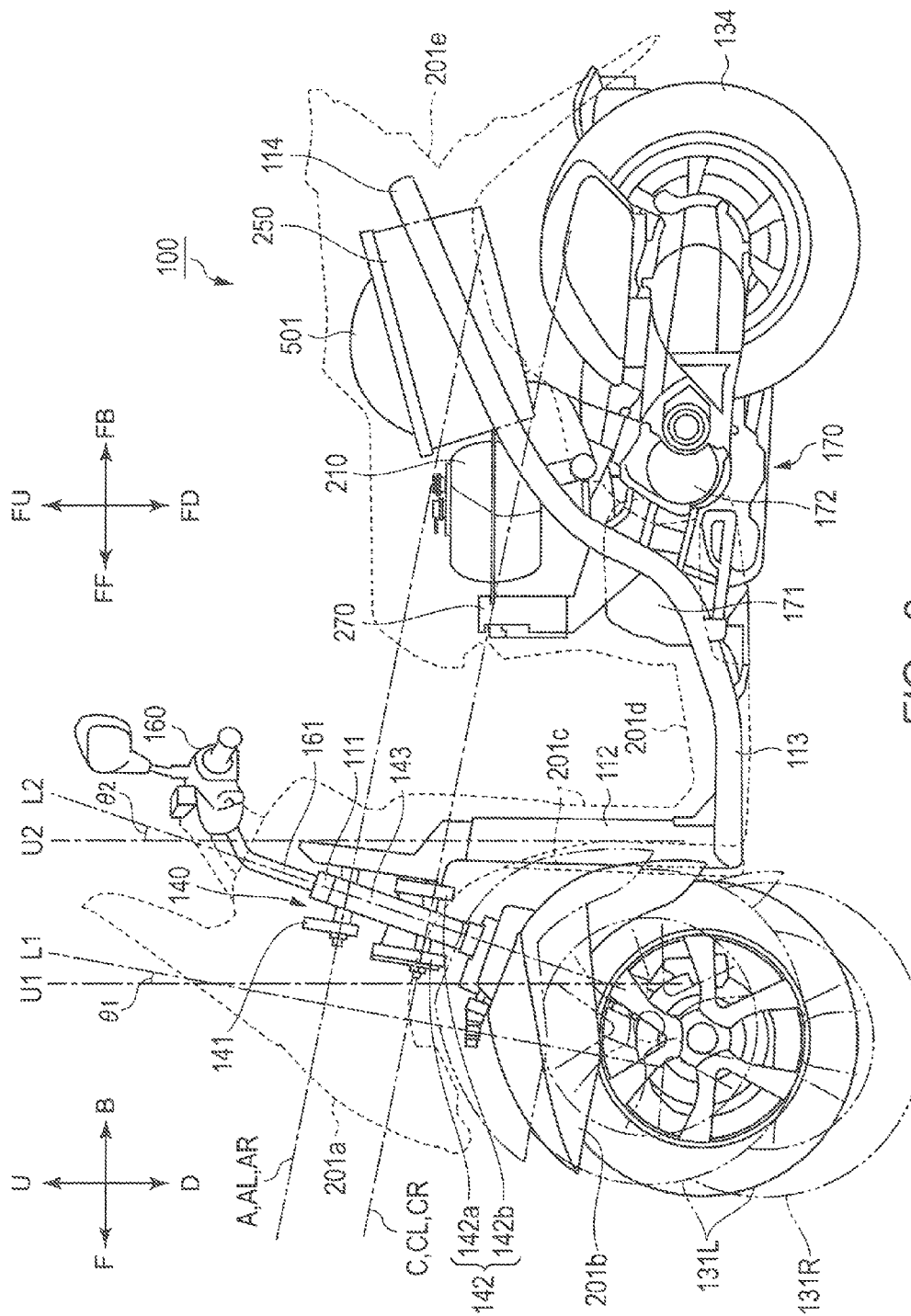
FIG. 3 is a side view showing the vehicle with the exterior removed.

FIG. 1 is a perspective view showing a vehicle according to a preferred embodiment of the present invention. FIG. 2 is a plan view showing the vehicle with the exterior removed. FIG. 3 is a side view showing the vehicle with the exterior removed. Broken lines indicate the exterior of vehicle 100 in FIGS. 2 and 3. In FIG. 3, alternate long and two short dashes lines indicate left front wheel 131L and right front wheel 131R when vehicle 100 tilts in the left-right direction.

As shown in FIG. 1, vehicle 100 of the present preferred embodiment includes left front wheel 131L, right front wheel 131R, rear wheel 134, handlebar 160, seat 180, and body covers (201a, 201b, 201c, 201d, and 201e). As shown in FIGS. 2 and 3, vehicle 100 also includes link mechanism 140, body frame 110 (see FIG. 2), power unit 170 (see FIG. 3), fuel tank 210, storage case 250, and heavy component 270 (see FIG. 3) that is a battery or a brake pressure controller.

Body frame 110 holds the components of vehicle 100. Body frame 110 includes link support 111, down frame 112, underframes 113, and rear frames 114. (see FIGS. 2 and 3).

Link support 111 is disposed on a front portion of vehicle 100. Link support 111 supports link mechanism 140. Although not particularly limited, link support 111 preferably also defines and functions as a head tube in the present preferred embodiment. Link support 111 as a head tube is tilted relative to the vertical direction so that the upper portion is positioned behind the lower portion in a side view of the vehicle 100. Link support 111 as a head tube supports handlebar 160 and steering shaft 161. Steering shaft 161 is inserted into link support 111 as a head tube so as to be turnable.

Down frame 112 extends below from link support 111 and is connected to underframe 113. Underframe 113 is disposed on the bottom of vehicle 100 and forward of seat 180 in a plan view. Underframe 113 supports floor portion 201d that is a body cover described below.

Rear frame 114 extends toward the rear portion of vehicle 100 from the rear end of underframe 113 and supports seat 180, fuel tank 210, storage case 250, and power unit 170. Power unit 170 may be supported by rear frame 114 through a swing arm.

Power unit 170 generates a driving force of rear wheel 134. Power unit 170 includes an engine, crankcase 171 housing a crank shaft, and transmission case 172 housing a transmission (see FIG. 3). The disposition of power unit 170 will be described below.

The body cover includes front cover 201a, a pair of left and right front fenders 201b, leg shield 201c, floor portion 201d, and rear cover 201e.

Front cover 201a covers at least a portion of the front of link mechanism 140.

Leg shield 201c is positioned behind link mechanism 140 and behind at least a portion of left front wheel 131L and right front wheel 131R. Leg shield 201c covers the front portion and the rear portion of down frame 112. Leg shield 201c is connected to floor portion 201d.

Floor portion 201d includes a floor surface for the rider seated on seat 180 to put his/her feet on. The floor surface is disposed forward of seat 180 and behind leg shield 201c in a plan view and is disposed at a position lower than upper ends of left front wheel 131L and right front wheel 131R in a side view. Although not particularly limited, the width of floor portion 201d is preferably the same or substantially the same as the length from the left end of left front wheel 131L to the right end of right front wheel 131R.

Rear cover 201e covers the surroundings of rear frames 114.

Seat 180 includes seating surface 181 on which the rider sits. The disposition of seat 180 will be described below.

Storage case 250 is disposed below the rear portion of seat 180. The upper portion of storage case 250 is covered by seat 180. Commodities can be taken in and out of storage case 250 when seat 180 is open. Although not particularly limited, helmet 501 may be housed in storage case 250 in a preferred embodiment of the present invention.

Fuel tank 210 stores fuel for power unit 170. A fuel hose is connected to fuel tank 210. The fuel is supplied from fuel tank 210 to power unit 170 through the fuel hose.

Left front wheel 131L and right front wheel 131R are disposed side by side in the left-right direction of body frame 110. Left front wheel 131L and right front wheel 131R tilt in the left-right direction along with body frame 110.

Rear wheel 134 is supported by a swing arm supported by body frame 110 or power unit 170 such that the swing arm is turnable. The swing arm is connected to rear frame 114 through a suspension. The suspension restricts the movement of the swing arm in the turning direction. Rear wheel 134 inclines in the left-right direction along with body frame 110.

Figure 4:
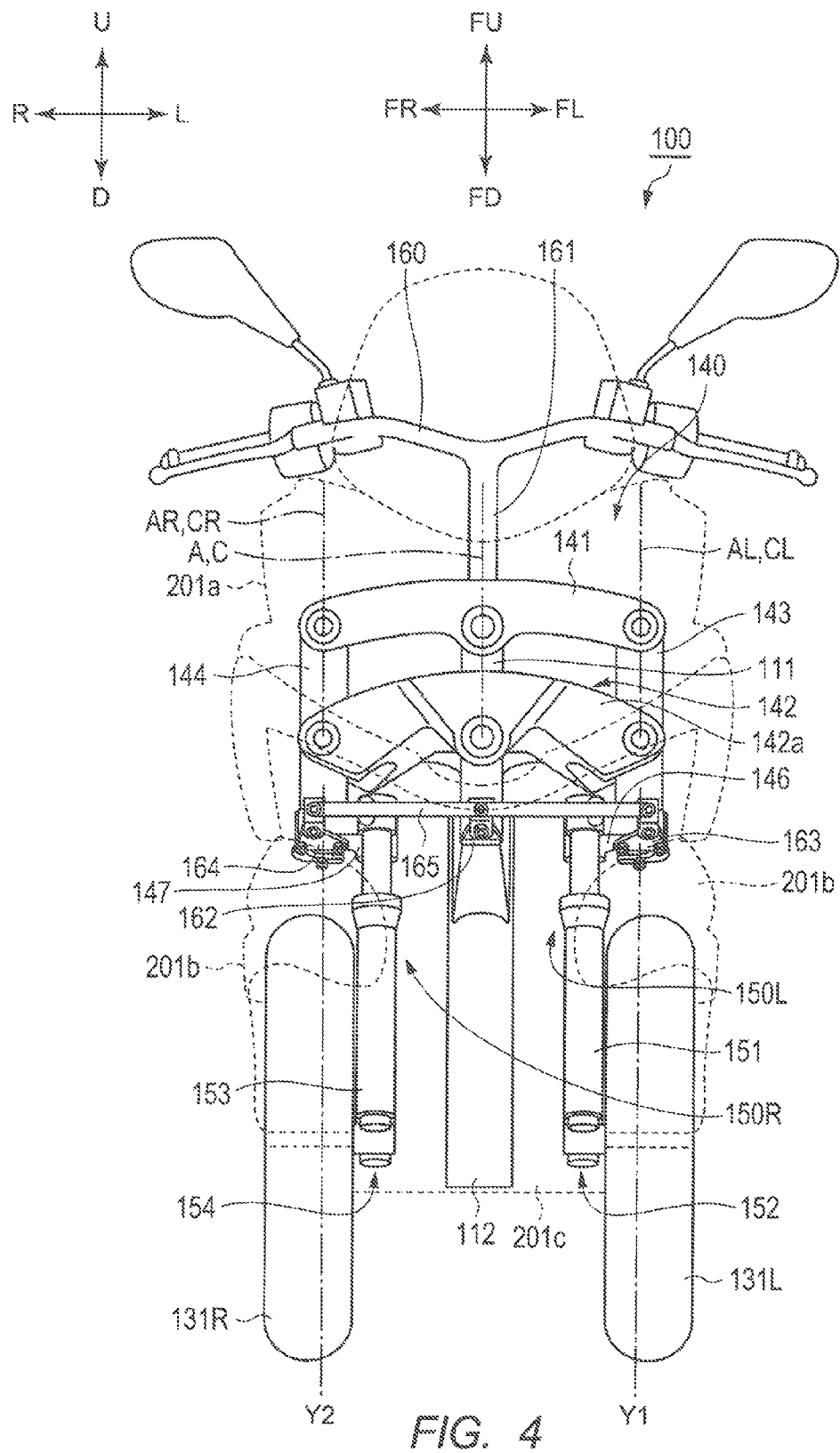
FIG. 4 is a front view showing a left front wheel, a right front wheel, a link mechanism, and their surroundings.
Figure 5:
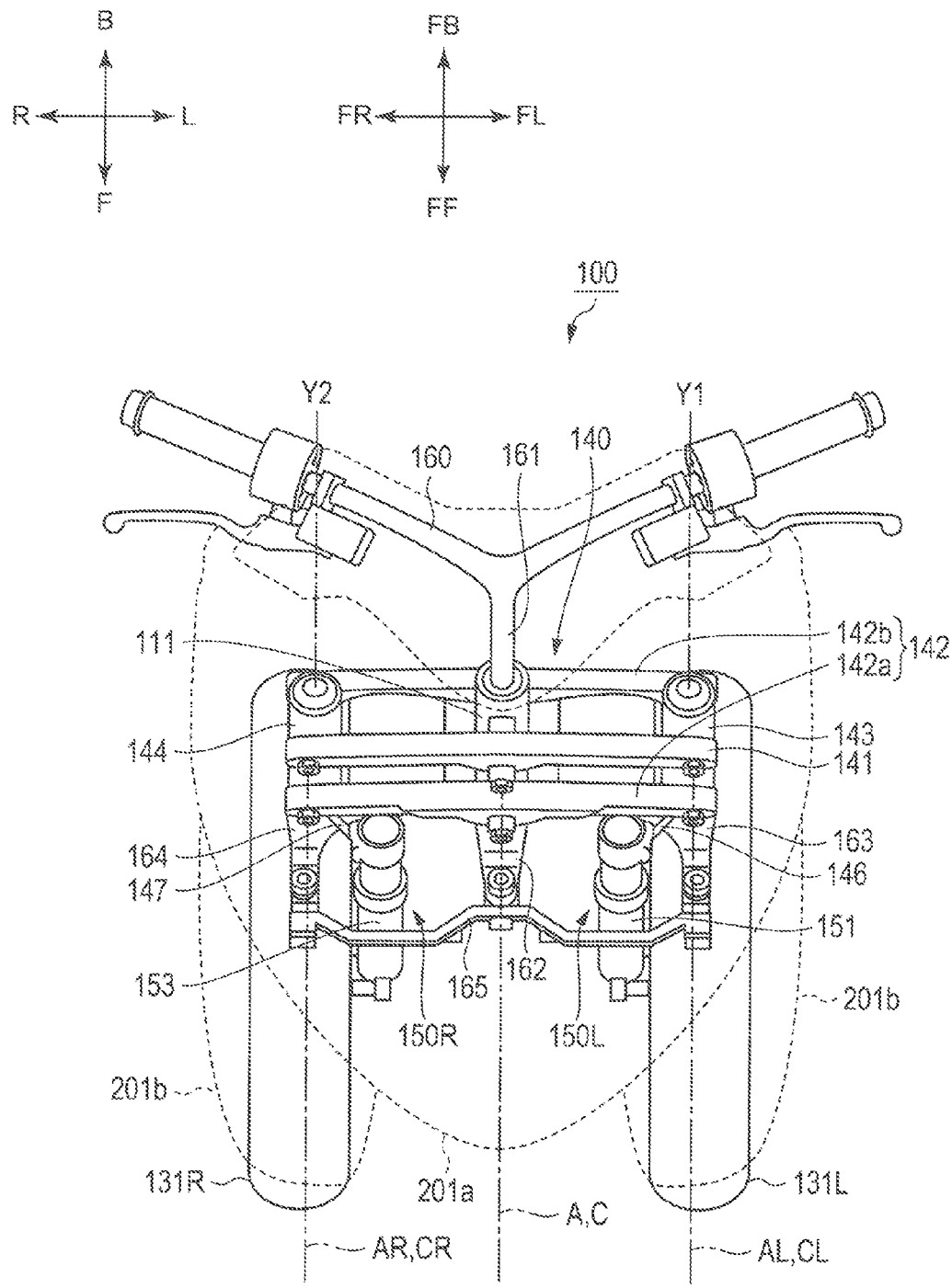
FIG. 5 is a plan view showing the left front wheel, the right front wheel, the link mechanism, and their surroundings.
Figure 6:
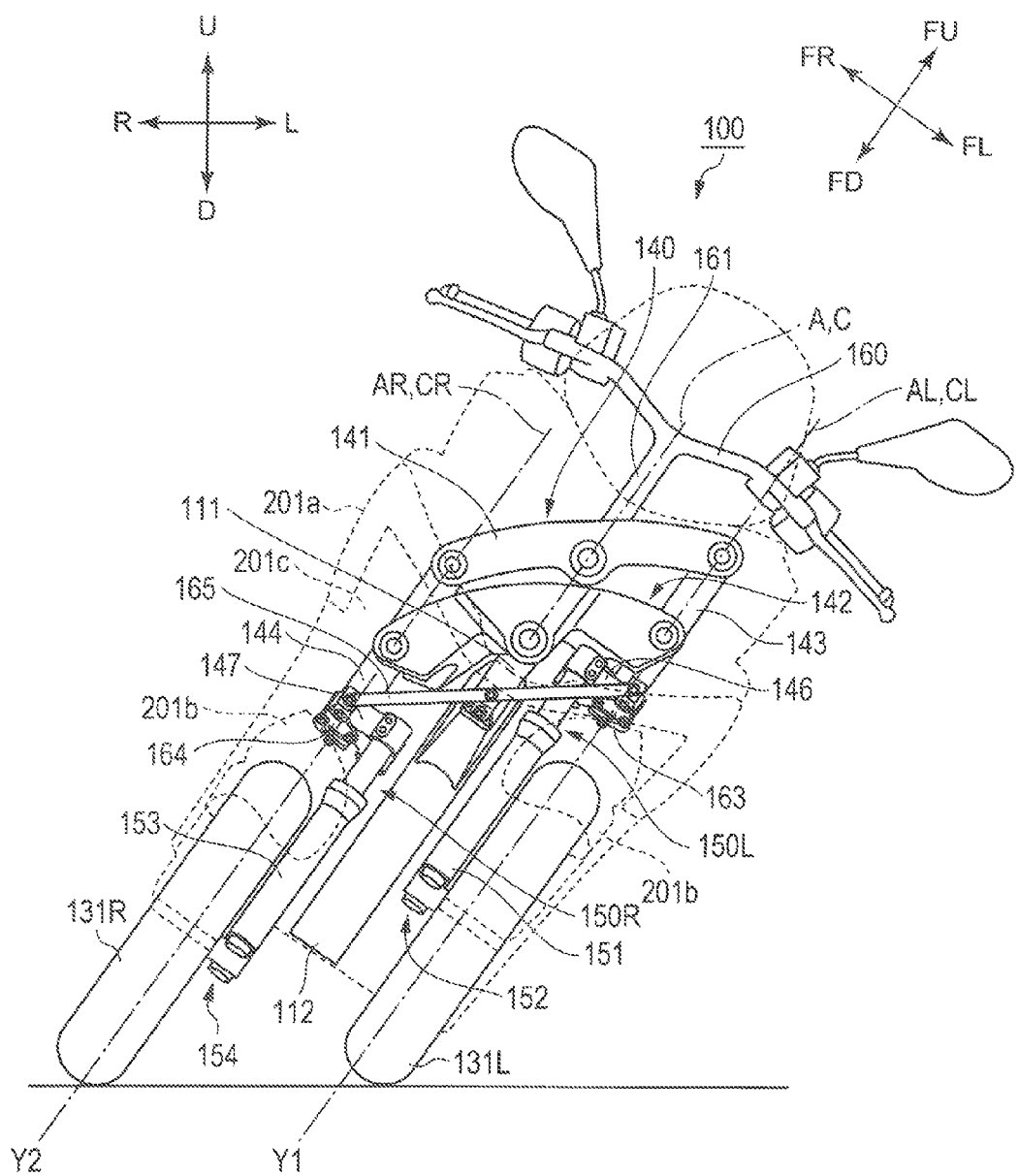
FIG. 6 is a front view showing a state of the link mechanism and the surroundings of the link mechanism when the vehicle tilts.
Figure 7:
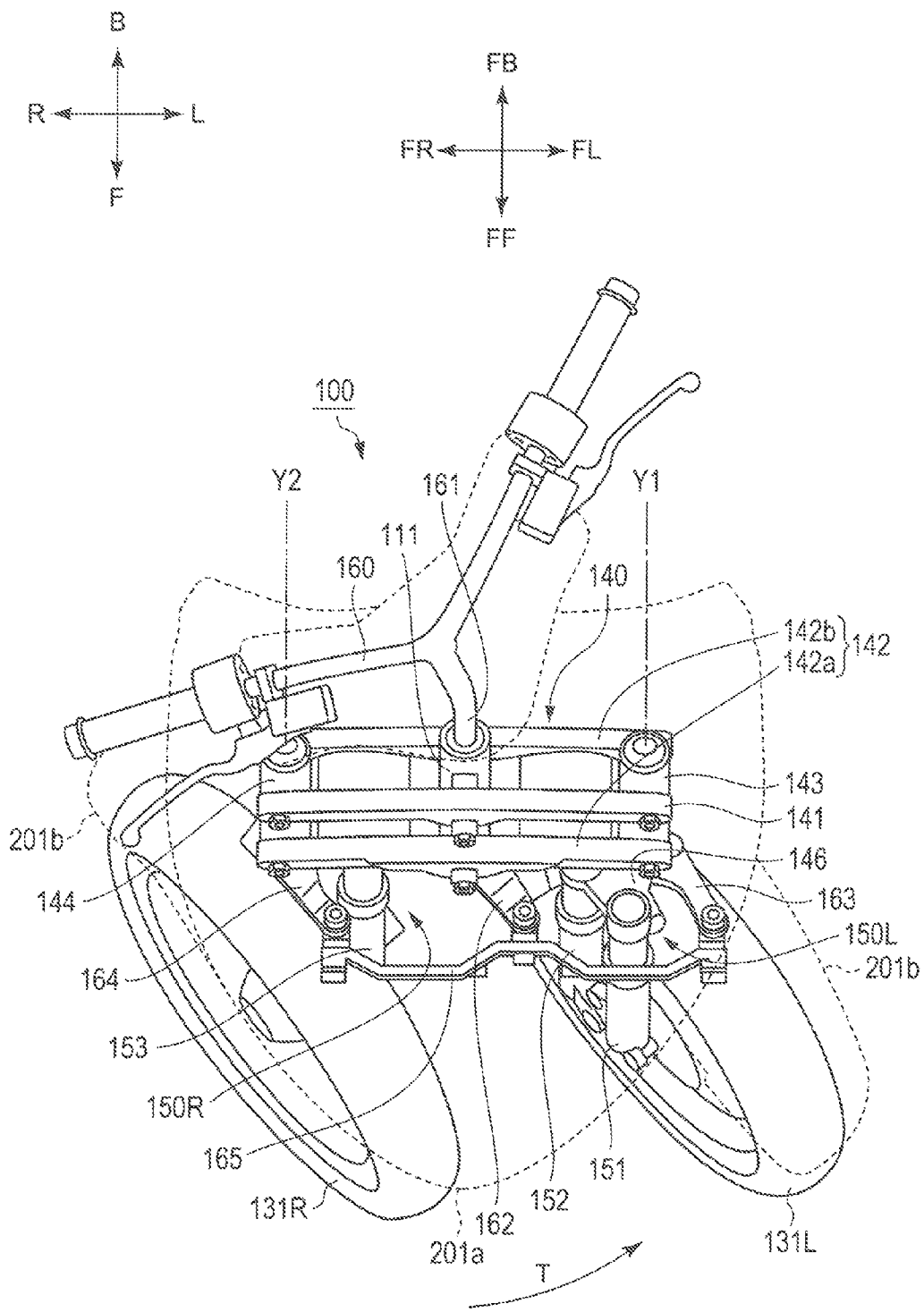
FIG. 7 is a plan view showing a state of the link mechanism and the surroundings of the link mechanism when the direction of a handlebar is changed.

FIG. 4 is a front view showing the left front wheel, the right front wheel, the link mechanism, and their surroundings. FIG. 5 is a plan view showing the left front wheel, the right front wheel, the link mechanism, and their surroundings. FIG. 6 is a front view showing a state of the link mechanism and the surroundings of the link mechanism when the vehicle tilts. FIG. 7 is a plan view showing a state of the link mechanism and the surroundings of the link mechanism when the direction of the handlebar is changed.

The link mechanism 140 preferably includes a parallel or substantially parallel four-bar linkage (also called parallelogram link).

Link mechanism 140 is supported by link support 111 of body frame 110. Link mechanism 140 includes upper cross member 141, lower cross member 142, left-side rod 143, and right-side rod 144 as components that perform a tilting action of vehicle 100.

An intermediate portion of upper cross member 141 is supported by link support 111. Upper cross member 141 is supported so as to be turnable around upper axis A (see FIG. 3) extending in the front-rear direction of body frame 110. Specifically, upper axis A is parallel or substantially parallel to plane FF-FU and is tilted 45 degrees or less in the direction of arrow FU from arrow FF.

A left end portion of upper cross member 141 is supported by left-side rod 143. Upper cross member 141 is turnable relative to left-side rod 143 around upper left axis AL parallel or substantially parallel to upper axis A. A right end portion of upper cross member 141 is supported by right-side rod 144. Upper cross member 141 is turnable relative to right-side rod 144 around upper right axis AR parallel or substantially parallel to upper axis A.

An intermediate portion of lower cross member 142 is supported by link support 111. Lower cross member 142 is supported so as to be turnable around lower axis C (see FIG. 3) parallel or substantially parallel to upper axis A. Lower cross member 142 is disposed below upper cross member 141. Lower cross member 142 preferably has the same or substantially the same length as upper cross member 141 in the vehicle width direction and is disposed parallel or substantially parallel to upper cross member 141.

A left end of lower cross member 142 is supported by left-side rod 143. Lower cross member 142 is turnable relative to left-side rod 143 around lower left axis CL parallel or substantially parallel to lower axis C. A right end portion of lower cross member 142 is supported by right-side rod 144. Lower cross member 142 is turnable relative to right-side rod 144 around lower right axis CR parallel or substantially parallel to lower axis C.

Although not particularly limited, lower cross member 142 of link mechanism 140 preferably includes front lower cross member 142a including a portion positioned forward of link support 111, left-side rod 143, and right-side rod 144; and rear lower cross member 142b including a portion positioned behind link support 111, left-side rod 143, and right-side rod 144 (see FIGS. 3 and 5).

Left-side rod 143 is disposed on the left of link support 111 and extends parallel or substantially parallel to the direction of the extension of link support 111. Left-side rod 143 is disposed above left front wheel 131L. Left-side rod 143 supports left shock absorber 150L, described below, such that the left shock absorber 150L is turnable around left axis Y1. Left shock absorber 150L is an example of a left front wheel support apparatus.

Right-side rod 144 is disposed on the right of link support 111 and extends parallel or substantially parallel to the direction of the extension of link support 111. Right-side rod 144 is disposed above right front wheel 131R. Right-side rod 144 supports right shock absorber 150R, described below, such that the right shock absorber 150R is turnable around right axis Y2. Right shock absorber 150R is an example of a right front wheel support apparatus.

In this manner, upper cross member 141, lower cross member 142, left-side rod 143, and right-side rod 144 are supported so that upper cross member 141 and lower cross member 142 maintain positions parallel or substantially parallel to each other, and left-side rod 143 and right-side rod 144 maintain positions parallel or substantially parallel to each other.

As shown in FIG. 6, link mechanism 140 tilts left front wheel 131L and right front wheel 131R when vehicle 100 tilts in the left-right direction (R-L direction). Link mechanism 140 relatively changes the levels of left front wheel 131L and right front wheel 131R in the up-down direction of body frame 110 (direction of arrows FU and FD) in response to body frame 110 that is tilting in the left-right direction.

A steering mechanism is disposed between handlebar 160 and left and right front wheels 131L and 131R. The steering mechanism includes steering shaft 161, center steering arm 162 (see FIG. 7), tie rod 165, left steering arm 163, right steering arm 164, left shock absorber 150L, and right shock absorber 150R.

Left shock absorber 150L includes left damper 151, left bracket 146, and left turn prevention mechanism 152. Left shock absorber 150L is supported by left-side rod 143 and tilts along with left-side rod 143.

Left damper 151 attenuates vibrations from a road by, for example, a telescopic structure. An upper end of left damper 151 is fixed to left bracket 146. A lower end of the left damper supports left front wheel 131L. In this manner, left damper 151 absorbs displacement of left front wheel 131L relative to an upper portion of left damper 151 in the up-down direction of body frame 110. The expansion and contraction direction of left damper 151 may be tilted from the up-down direction of body frame 110. In this case, left front wheel 131L is also displaced relative to the upper portion of left damper 151 in the front-rear direction or the left-right direction of body frame 110. In this case, left damper 151 also absorbs the displacement of left front wheel 131L in the front-rear direction or the left-right direction.

Left turn prevention mechanism 152 is disposed parallel or substantially parallel to left damper 151. Left turn prevention mechanism 152 preferably includes a telescopic structure. An upper end of left turn prevention mechanism 152 is fixed to left bracket 146. A lower end of left turn prevention mechanism 152 supports left front wheel 131L.

Left damper 151 and left turn prevention mechanism 152 support left front wheel 131L to associate left bracket 146 with left front wheel 131L to prevent a relative change in the direction of left bracket 146 and the direction of left front wheel 131L.

Right shock absorber 150R includes right damper 153, right bracket 147, and right turn prevention mechanism 154. Right shock absorber 150R is supported by right-side rod 144 and tilts along with right-side rod 144.

Right damper 153 attenuates vibrations from a road by, for example, a telescopic structure. An upper end of right damper 153 is fixed to right bracket 147. A lower end of right damper 153 supports right front wheel 131R. In this manner, right damper 153 absorbs displacement of right front wheel 131R relative to an upper portion of right damper 153 in the up-down direction of body frame 110. The expansion and contraction direction of right damper 153 may be tilted from the up-down direction of body frame 110. In this case, right front wheel 131R is also displaced relative to the upper portion of right damper 153 in the front-rear direction or the left-right direction of body frame 110. In this case, right damper 153 also absorbs the displacement in the front-rear direction or the left-right direction of right front wheel 131R.

Right turn prevention mechanism 154 is disposed parallel or substantially parallel to right damper 153. Right turn prevention mechanism 154 preferably includes a telescopic structure. An upper end of right turn prevention mechanism 154 is fixed to right bracket 147. A lower end of right turn prevention mechanism 154 supports right front wheel 131R.

Right damper 153 and right turn prevention mechanism 154 support right front wheel 131R to associate right bracket 147 with right front wheel 131R to prevent a relative change in the direction of right bracket 147 and the direction of right front wheel 131R.

Steering shaft 161 is supported by body frame 110 such that steering shaft 161 is turnable, and steering shaft 161 changes the direction of left front wheel 131L and right front wheel 131R.

Center steering arm 162 and tie rod 165 are disposed above left front wheel 131L and right front wheel 131R. One end portion of center steering arm 162 is fixed to steering shaft 161, and center steering arm 162 turns along with steering shaft 161. The other end portion of center steering arm 162 is supported by tie rod 165. Center steering arm 162 transmits the turning of steering shaft 161 to tie rod 165.

Left steering arm 163 is fixed to left bracket 146.

Right steering arm 164 is fixed to right bracket 147.

Tie rod 165 supports center steering arm. 162, left steering arm 163, and right steering arm 164 and transmits the turning of center steering arm 162 to left steering arm 163 and right steering arm 164.

According to the above configuration, when handlebar 160 is operated to turn steering shaft 161 and center steering arm 162, left bracket 146 and right bracket 147 turn at the same angle as shown in FIG. 7. As a result, left front wheel 131L and right front wheel 131R are steered in same direction T.

As shown in FIG. 4, upper cross member 141 and lower cross member 142 of link mechanism 140 are disposed below handlebar 160 and above the upper ends of left front wheel 131L and right front wheel 131R, in a side view with body frame 110 in the upright state. As shown in FIG. 5, upper cross member 141 and lower cross member 142 of link mechanism 140 are disposed at positions overlapping with left front wheel 131L and right front wheel 131R in the front-rear direction of body frame 110. More specifically, upper cross member 141 and lower cross member 142 of link mechanism 140 are disposed between a vertical line passing through the front end of right front wheel 131R and a vertical line passing through the rear end of right front wheel 131R and between a vertical line passing through the front end of left front wheel 131L and a vertical line passing through the rear end of left front wheel 131L in a side view. Upper cross member 141 and lower cross member 142 of link mechanism 140 are disposed behind the ground contacting portions of left front wheel 131L and right front wheel 131R in the front-rear direction of body frame 110.

As shown in FIG. 3, the angle defined by virtual line L1, which is perpendicular or substantially perpendicular to upper axis A and lower axis C of link mechanism 140, and the vertical line (direction of arrow U) is smaller than the angle defined by turning axis L2 of steering shaft 161 and the vertical line, in a side view with body frame 110 in the upright state. In the present description, the virtual line is a straight line. Therefore, angle θ1 defined by virtual line L1 and vertical line U1 is smaller than angle θ2 defined by turning axis L2 and vertical line U2. Turning axis L2 of steering shaft 161 is parallel or substantially parallel to left axis Y1 and right axis Y2 (see FIG. 4).

Crankcase 171 (see FIG. 3) is disposed below the upper ends of right front wheel 131R, left front wheel 131L, and rear wheel 134 in the up-down direction of body frame 110, with body frame 110 in the upright state.

Power unit 170 is disposed behind left front wheel 131L, right front wheel 131R, and link mechanism 140 in the front-rear direction of body frame 110. Although not particularly limited, power unit 170 is preferably disposed behind floor portion 201d in the front-rear direction of body frame 110 in the present preferred embodiment.

Crankcase 171 is disposed between the rear ends of right and left front wheels 131R and 131L and the front end of rear wheel 134 in the front-rear direction of body frame 110. Crankcase 171 and transmission case 172 are disposed closer to the front end of rear wheel 134 than to the rear ends of right and left front wheels 131R and 131L in the front-rear direction of body frame 110. In other words, the center between crankcase 171 and transmission case 172 in the front-rear direction body frame 110 is positioned behind the center between the rear ends of right and left front wheels 131R and 131L and the front end of rear wheel 134 in the front-rear direction of body frame 110.

Seating surface 181 of seat 180 is disposed between the upper end (horizontal line V2 of FIG. 8) of upper cross member 141 and the lower end (horizontal line V1 of FIG. 8) of lower cross member 142 of link mechanism 140 in the up-down direction of body frame 110, with body frame 110 in the upright state. Seating surface 181 is disposed between one of the front end of crankcase 171 (see FIG. 8) and the front end of transmission case 172 (see FIG. 8) of power unit 170, which is positioned more forward than the other; and the rear end of rear wheel 134, in the front-rear direction of body frame 110.

Figure 8:
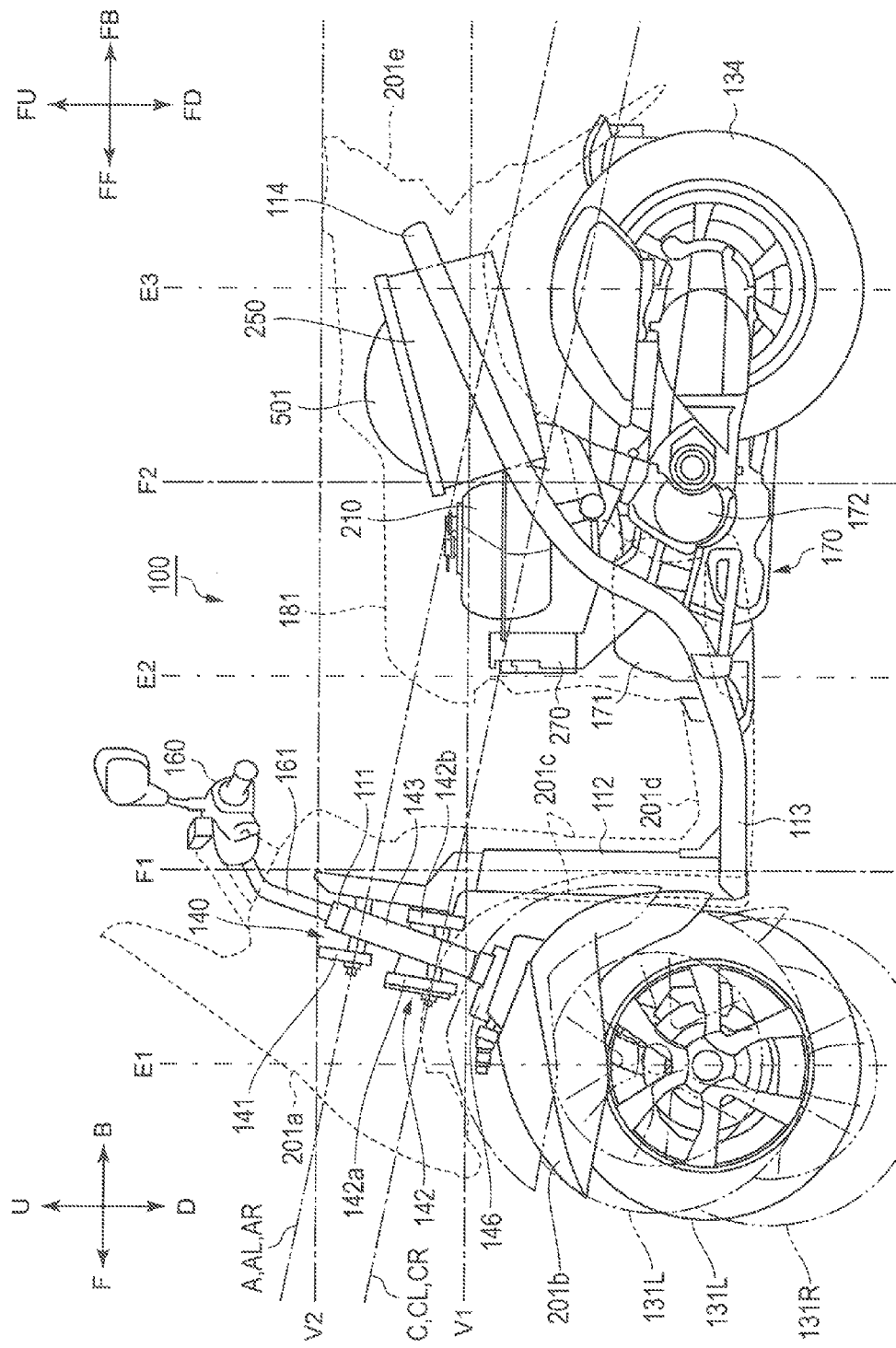
FIG. 8 is a side view showing a disposition of a fuel tank.

Heavy component 270 is disposed in a range surrounded by virtual lines F1 and F2, upper axis A, and lower axis C of FIG. 8, in a side view with body frame 110 in the upright state. A portion of heavy component 270 is disposed below upper axis A and above lower axis C, and the rest of heavy component 270 is disposed below lower axis C. Virtual lines F1 and F2 will be described below.

FIG. 8 is a side view showing the disposition of fuel tank 210. FIG. 9 is a plan view showing the disposition of fuel tank 210. In FIG. 8, alternate long and two short dashes lines indicate left front wheel 131L and right front wheel 131R when vehicle 100 tilts in the left-right direction. In FIG. 9, a broken line indicates the exterior of vehicle 100.

In the present description, the upper end of the fuel tank denotes the upper end of a fuel filler neck. The front end, the rear end, the lower end, the left end, and the right end of the fuel tank mean the front end, the rear end, the lower end, the left end, and the right end of the space housing the fuel.

As shown in FIG. 8, fuel tank 210 is disposed between upper axis A and lower axis C of link mechanism 140 in the up-down direction of body frame 110, with body frame 110 in the upright state. A portion of fuel tank 210 is positioned below lower axis C, and the rest of fuel tank 210 is positioned between upper axis A and lower axis C, in a side view of vehicle 100.

As shown in FIG. 8, the upper end of fuel tank 210 is disposed above the lower end (horizontal line V1) of lower cross member 142 of link mechanism 140 in the up-down direction of body frame 110, with body frame 110 in the upright state.

As shown in FIG. 8, fuel tank 210 is disposed between virtual line F1 and virtual line F2 in the front-rear direction of body frame 110. The front end of fuel tank 210 is disposed between virtual line F1 and virtual line F2, and the rear end of fuel tank 210 is disposed behind virtual line F2, in a side view of vehicle 100.

Virtual line F1 indicates the center between center position E1 of left and right front wheel ground contacting portions and center line E2, in a side view with body frame 110 in the upright state. Center line E2 indicates the center between center position E1 of the left and right front wheel ground contacting portions and center position E3 of a rear wheel ground contacting portion. Virtual line F2 indicates the center between center line E2 and center position E3 of the rear wheel ground contacting portion, in a side view with body frame 110 in the upright state. The left front wheel ground contacting portion denotes the ground contacting portion of left front wheel 131L. The right front wheel ground contacting portion denotes the ground contacting portion of right front wheel 131R. In a side view with body frame 110 in the upright state, the left front wheel ground contacting portion and the right front wheel ground contacting portion are positioned at similar positions in the front-rear direction of body frame 110. Therefore, center position E1 of the left front wheel ground contacting portion and the right front wheel ground contacting portion is the center position of the left front wheel ground contacting portion and the center position of the right front wheel ground contacting portion. The rear wheel ground contacting portion denotes the ground contacting portion of rear wheel 134.

As shown in FIG. 9, the right end of fuel tank 210 is disposed on the right of virtual line H1, and the left end of fuel tank 210 is disposed on the left of virtual line H2, in the left-right direction of body frame 110 with body frame 110 in the upright state.

Virtual line H1 indicates the center between right end position G1 of upper cross member 141 and lower cross member 142 and center position G2 of upper cross member 141 and lower cross member 142, in the left-right direction of body frame 110 with body frame 110 in the upright state. Virtual line H2 indicates the center between left end position G3 of upper cross member 141 and lower cross member 142 and center position G2 of upper cross member 141 and lower cross member 142, in the left-right direction of body frame 110 with body frame 110 in the upright state. Center position G2 indicates the center of upper cross member 141 and lower cross member 142 in the left-right direction.

Figure 10:
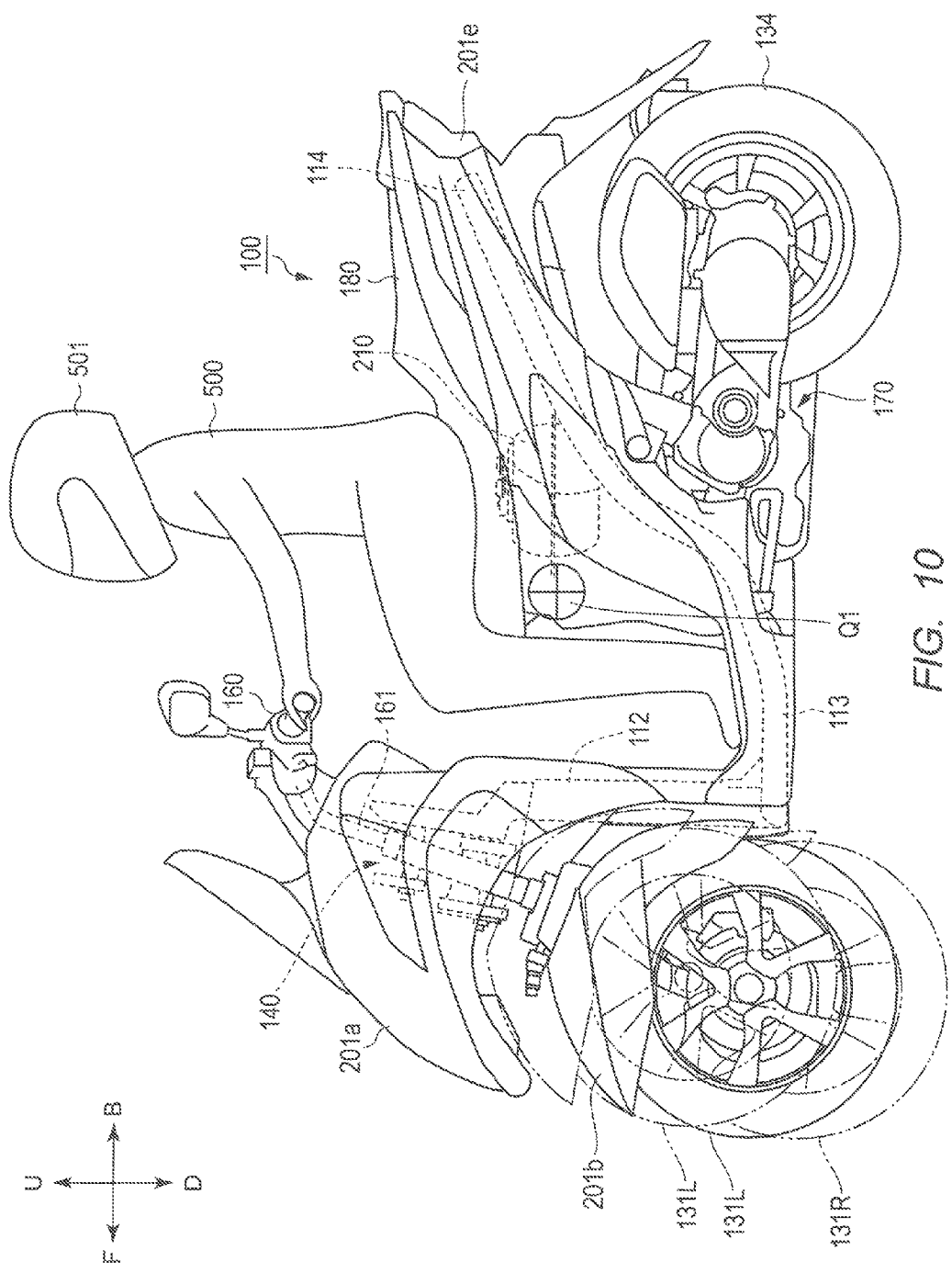
FIG. 10 is a side view showing the center of gravity of the vehicle with a rider on the vehicle.

FIG. 10 is a side view showing the center of gravity of the vehicle with the rider on the vehicle. In FIG. 10, alternate long and two short dashes lines indicate left front wheel 131L and right front wheel 131R when vehicle 100 tilts in the left-right direction.

As described above, according to vehicle 100 of the present preferred embodiment, link mechanism 140 is disposed above right front wheel 131R and left front wheel 131L, with body frame 110 in the upright state. Link mechanism 140 overlaps with right front wheel 131R and left front wheel 131L in the front-rear direction of body frame 110, with body frame 110 in the upright state. Angle θ1 defined by virtual line L1, which is perpendicular or substantially perpendicular to upper axis A and lower axis C, and vertical line U1 is smaller than θ2 defined by turning axis L2 of steering shaft 161 and vertical line U2, in a side view with body frame 110 in the upright state. In power unit 170, crankcase 171 is disposed below the upper end of right front wheel 131R, the upper end of left front wheel 131L, and the upper end of rear wheel 134 in the up-down direction of body frame 110 and between right and left front wheels 131R and 131L and rear wheel 134 in the front-rear direction of body frame 110, with body frame 110 in the upright state. Crankcase 171 and transmission case 172 are disposed closer to rear wheel 134 than to right front wheel 131R and left front wheel 131L in the front-rear direction of body frame 110, with body frame 110 in the upright state. In seat 180, seating surface 181 is positioned between the front ends of crankcase 171 and transmission case 172 and the rear end of rear wheel 134 in the front-rear direction of body frame 110, with body frame 110 in the upright state. Fuel tank 210 is disposed between the extension line of upper axis A and the extension line of lower axis C in the up-down direction of body frame 110, with body frame 110 in the upright state. In the front-rear direction of body frame 110 with body frame 110 in the upright state, fuel tank 210 is disposed between the center between the center of the right and left front wheel ground contacting portions and the rear wheel ground contacting portion and the center of the right front wheel ground contacting portion and the left front wheel ground contacting portion, in which right front wheel 131R is grounded at the right front wheel ground contacting portion, left front wheel 131L is grounded at the left front wheel ground contacting portion, and rear wheel 134 is grounded at the rear wheel ground contacting portion; and the center between the center of the left and right front wheel ground contacting portions and the rear wheel ground contacting portion and the center of the rear wheel ground contacting portion.

According to vehicle 100 of the present preferred embodiment, heavy link mechanism 140, heavy power unit 170, and heavy seat 180 on which the rider sits are disposed in the relationship described above. As a result, fuel tank 210 is disposed near center of gravity Q1 (see FIG. 10) of vehicle 100 with rider 500 on the vehicle. Therefore, according to vehicle 100 of the present preferred embodiment, vehicle 100 is provided with a small amount of change in the position of center of gravity Q1 based on the remaining fuel. Thus, vehicle 100 is provided with a small amount of change in center of gravity Q1 during operation, while a large capacity of fuel tank 210 is ensured.

In vehicle 100 of the present preferred embodiment, the front portion of vehicle 100 has a vehicle width that allows left front wheel 131L and right front wheel 131R to be disposed side by side in the left-right direction. Alternatively, the front portion of vehicle 100 has a vehicle width greater than the width of link mechanism 140. Therefore, fuel tank 210 with a large width in the left-right direction is easily mounted on vehicle 100. According to vehicle 100 of the present preferred embodiment, the left end of fuel tank 210 is disposed on the left of virtual line H2 of FIG. 9, and the right end of fuel tank 210 is disposed on the right of virtual line H1 of FIG. 9. Therefore, the width of fuel tank 210 increases. This reduces the height of fuel tank 210 while ensuring the capacity of the fuel tank. Therefore, vehicle 100 is provided with a small change in the amount of change in center of gravity Q1 depending on the remaining fuel during operation, while a large capacity of fuel tank 210 is ensured.

In vehicle 100 of the present preferred embodiment, the rear end of fuel tank 210 is disposed forward of the center of the left and right front wheel ground contacting portions and the rear wheel ground contacting portion in the front-rear direction of body frame 110 with body frame 110 in the upright state, between the extension line of the upper axis and the extension line of the lower axis in the up-down direction of body frame 110. Therefore, fuel tank 210 is disposed at a high position close to the center of gravity of the vehicle with the rider on the vehicle. The angle defined by the virtual line, which is perpendicular or substantially perpendicular to the upper axis and the lower axis, and the vertical line is smaller than the angle defined by the turning axis of steering shaft 161 and the vertical line, in a side view with body frame 110 in the upright state. Therefore, the movable range of link mechanism 140 in the front-rear direction of body frame 110 associated with banking of vehicle 100 is small. This reduces or prevents a reduction in the capacity of fuel tank 210 even if the rear end of fuel tank 210 is disposed forward of the center of the left and right front wheel ground contacting portions and the rear wheel ground contacting portion.

In vehicle 100 of the present preferred embodiment, the rear end of fuel tank 210 is disposed behind the center of the left and right front wheel ground contacting portions and the rear wheel ground contacting portion, in the front-rear direction of body frame 110 with body frame 110 in the upright state. Therefore, fuel tank 210 is disposed at a low position close to the center of gravity of the vehicle with the rider on the vehicle. As a result, a vehicle is provided with a small amount of change in the center of gravity depending on the remaining fuel during operation. Therefore, vehicle 100 is provided with a small amount of change in the center of gravity depending on the remaining fuel during operation, while a large capacity of fuel tank 210 is ensured.

In vehicle 100 of the present preferred embodiment, fuel tank 210 overlaps with the center of the left and right front wheel ground contacting portions and the rear wheel ground contacting portion. Therefore, a large capacity of fuel tank 210 is easily ensured, while fuel tank 210 is disposed closer to the center of gravity of the vehicle with the rider on the vehicle. As a result, vehicle 100 is provided with a small amount of change in the center of gravity depending on the remaining fuel during operation, while a large capacity of fuel tank 210 is ensured.

According to vehicle 100 of the present preferred embodiment, the upper end of fuel tank 210 is disposed above the lower end of lower cross member 142 in the up-down direction of body frame 110. Therefore, fuel tank 210 is closer to center of gravity Q1 of vehicle 100 with the rider on the vehicle. As a result, vehicle 100 is provided with a small amount of change in the center of gravity during operation.

According to vehicle 100 of the present preferred embodiment, heavy component 270 is disposed as described above, and heavy component 270 is disposed near center of gravity Q1 of vehicle 100 during operation.

First Variation of Disposition of Fuel Tank 210A

Figure 11:
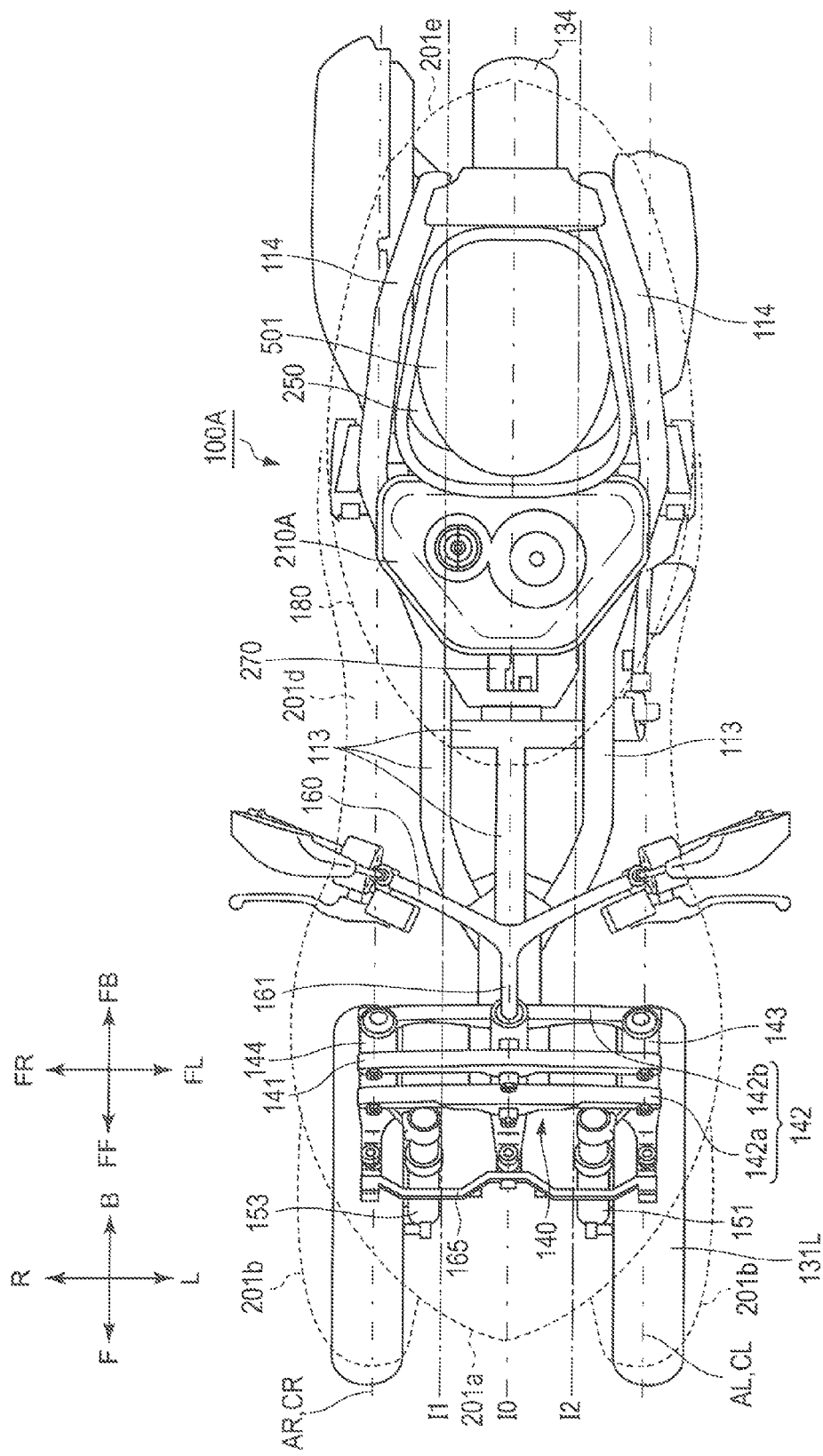
FIG. 11 is a plan view showing a first variation of the disposition of the fuel tank.

FIG. 11 is a plan view describing a first variation of the disposition of the fuel tank. In FIG. 11, a broken line indicates the exterior of vehicle 100A.

The first variation is an example in which a condition of the disposition of fuel tank 210A in the left-right direction is changed.

In the first variation, the right end of fuel tank 210A is disposed on the right of virtual line I1, and the left end of fuel tank 210A is disposed on the left of virtual line I2, in the left-right direction of body frame 110 with body frame 110 in the upright state.

In vehicle 100A of the first variation, it is only necessary that the right end of fuel tank 210A is disposed slightly to the right of virtual line I1 and that the left end of fuel tank 210A is disposed slightly to the left of virtual line I2.

Virtual line I1 indicates a position of the center between right upper axis AR of link mechanism 140 and center line I0 in the left-right direction, in the left-right direction of body frame 110 with body frame 110 in the upright state. Virtual line I2 indicates a position of the center between left upper axis AL of link mechanism 140 and center line I0 in the left-right direction, in the left-right direction of body frame 110 with body frame 110 in the upright state. Center line I0 in the left-right direction indicates a position of the center between left upper axis AL and right upper axis AR.

In the first variation, the disposition conditions of fuel tank 210A in the front-rear direction and the up-down direction are preferably the same as those in the preferred embodiments described above.

According to vehicle 100A of the first variation, the disposition of fuel tank 210A in the left-right direction is based on right upper axis AR and left upper axis AL, and the width of fuel tank 210A in the left-right direction is large.

Therefore, the height of fuel tank 210A is small, while a large capacity of the fuel is ensured in vehicle 100A of the first variation. As a result, vehicle 100A is provided with a small amount of change in center of gravity Q1 during operation, while a large capacity of fuel tank 210A is ensured.

Second Variation of Disposition of Fuel Tank

Figure 12:
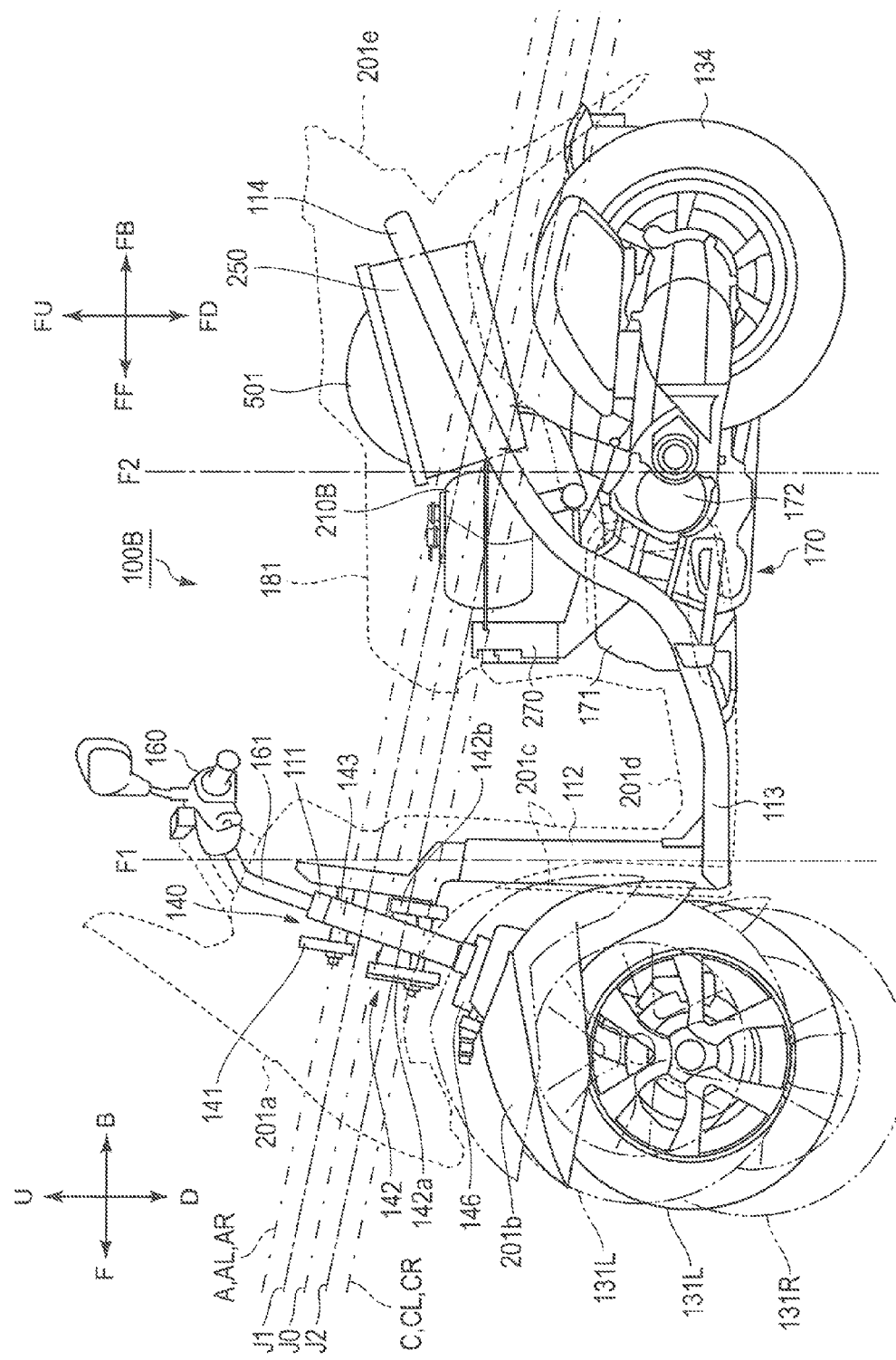
FIG. 12 is a side view showing a second variation of the disposition of the fuel tank.

FIG. 12 is a side view describing a second variation of the disposition of the fuel tank. In FIG. 12, alternate long and two short dashes lines indicate left front wheel 131L and right front wheel 131R when vehicle 100B tilts in the left-right direction.

The second variation is an example in which a condition of the disposition of fuel tank 210B in the up-down direction is added.

In the second variation, a portion of fuel tank 210B is disposed above virtual line J1, and another portion of fuel tank 210B is disposed below virtual line J2, in a side view with body frame 110 in the upright state.

Virtual line J1 indicates the center between upper axis A of link mechanism 140 and center axis J0 parallel or substantially parallel to upper axis A. Virtual line J2 indicates the center between lower axis C of link mechanism 140 and center axis J0 parallel or substantially parallel to lower axis C. Center axis J0 is an axis indicating the center between upper axis A and lower axis C.

In the second variation, the other disposition conditions of fuel tank 210B are preferably the same as those in the preferred embodiments described above.

According to vehicle 100B of the second variation, fuel tank 210B is positioned closer to center of gravity Q1 of vehicle 100B during operation. Therefore, vehicle 100B is provided with a small amount of change in the position of center of gravity Q1 depending on the remaining fuel.

Third Variation of Disposition of Fuel Tank

Figure 13:
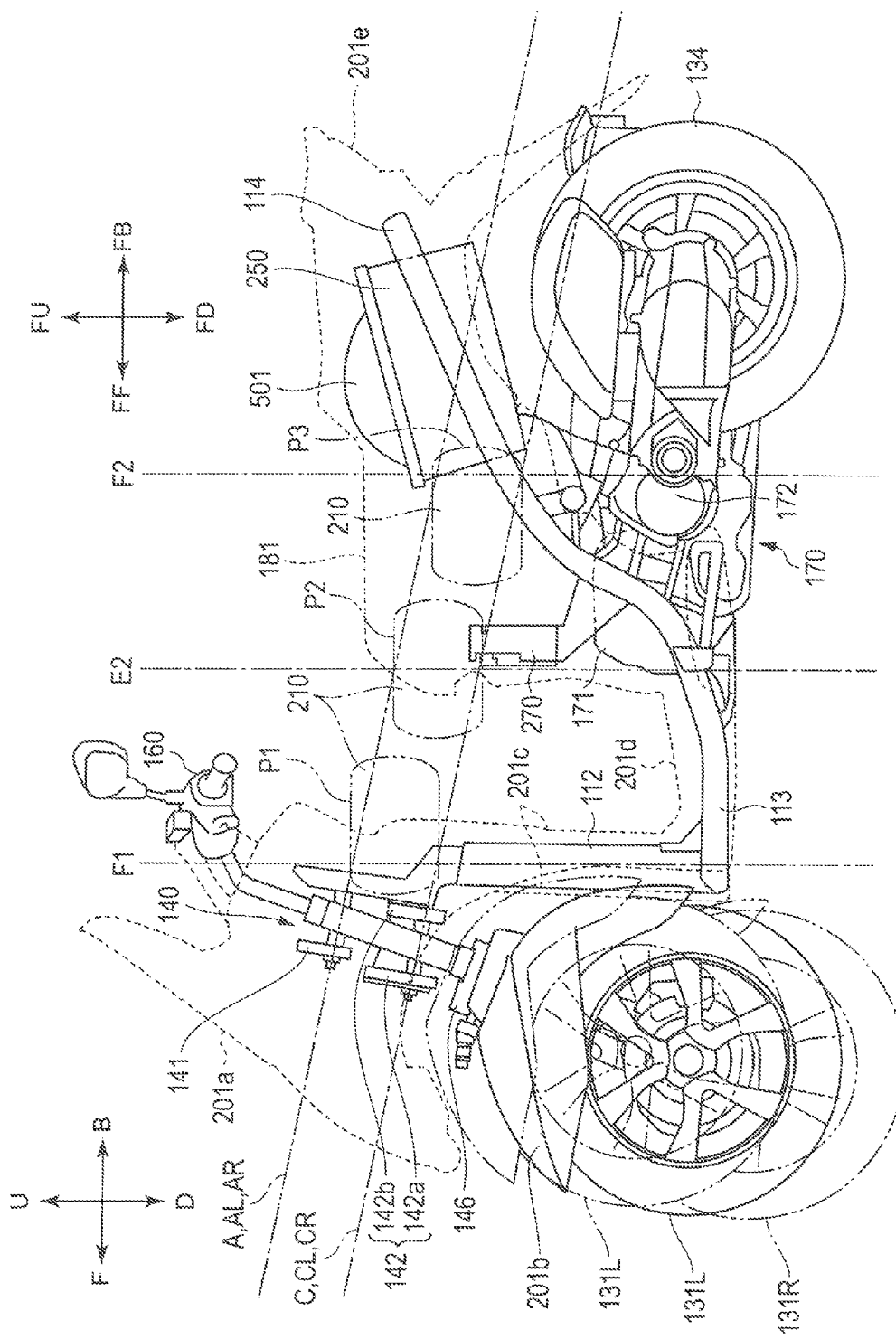
FIG. 13 is a side view showing a third variation of the disposition of the fuel tank.

FIG. 13 is a side view describing a third variation of the disposition of the fuel tank. In FIG. 13, alternate long and two short dashes lines indicate left front wheel 131L and right front wheel 131R when the body tilts in the left-right direction.

Position P1 is an example in which the rear end of fuel tank 210 is disposed forward of center line E2.

Position P2 is an example in which fuel tank 210 overlaps with center line E2.

Position P3 is an example in which the front end of fuel tank 210 is disposed behind center line E2.

At least a portion of each of positions P1 to P3 overlaps with a range surrounded by virtual lines F1 and F2, upper axis A, and lower axis C, in a side view with body frame 110 in the upright state.

Fuel tank 210 may be disposed on any of positions P1, P2, and P3 in a side view with body frame 110 in the upright state.

Fuel tank 210 may be appropriately disposed according to the vehicle type as long as the disposition conditions of fuel tank 210 described in the preferred embodiments above are satisfied.

An example of the vehicle type includes a type in which there is no floor portion 201d, while a portion of power unit 170 is disposed forward of the front end of seating surface 181 of seat 180, and the rider straddles the vehicle.

Preferred embodiments of the present invention have been described thus far.

The dispositions of the components of vehicles 100, 100A, and 100B are specifically described and illustrated in the drawings in the preferred embodiments of the present invention. However, the dispositions of the components are not limited to the specific dispositions illustrated in the drawings.

For example, a portion of fuel tank 210 is preferably disposed below lower axis C, and the rest is disposed between upper axis A and lower axis C in a side view with body frame 110 in the upright state in the preferred embodiment described with reference to FIG. 8. However, it is only necessary that fuel tank 210 is disposed between upper axis A and lower axis C of link mechanism 140 in the up-down direction of body frame 110, with body frame 110 in the upright state. More specifically, a portion of fuel tank 210 may be disposed above upper axis A, and the rest of fuel tank 210 may be disposed between upper axis A and lower axis C in a side view of vehicle 100. The entire fuel tank 210 may be disposed between upper axis A and lower axis C in a side view of vehicle 100. A portion of fuel tank 210 may be disposed above upper axis A, another portion of fuel tank 210 may be disposed below lower axis C, and the rest of fuel tank 210 may be disposed between upper axis A and lower axis C, in a side view of vehicle 100.

The front end of fuel tank 210 is preferably positioned between virtual line F1 and virtual line F2, and the rear end of fuel tank 210 is preferably disposed behind virtual line F2 in a side view of vehicle 100 in the preferred embodiment described with reference to FIG. 8. However, it is only necessary that fuel tank 210 is disposed between virtual line F1 and virtual line F2 in the front-rear direction of body frame 110. More specifically, the front end and the rear end of fuel tank 210 may be disposed between virtual lines F1 and F2 in a side view of vehicle 100. The front end of fuel tank 210 may be disposed forward of virtual line F1, and the rear end of fuel tank 210 may be disposed between virtual lines F1 and F2 in a side view of vehicle 100. The front end of fuel tank 210 may be disposed forward of virtual line F1, and the rear end of fuel tank 210 may be disposed behind virtual line F2 in a side view of vehicle 100.

Preferred embodiments of the present invention include conditions of the disposition of fuel tank 210 in the up-down direction and the front-rear direction of body frame 110. The disposition of fuel tank 210 in the left-right direction is also described in the preferred embodiments of the present invention. However, the size of fuel tank 210 in the left-right direction is not limited in the preferred embodiments of the present invention.

More preferred specific examples of the disposition of the components of vehicles 100, 100A, and 100B are described in the preferred embodiments with reference to the accompanying drawings. However, the more preferred disposition of the components is not limited to the specific dispositions illustrated in the drawings, and it is only necessary that the conditions described in the claims are satisfied.

For example, the right end of fuel tank 210 is preferably disposed on the right of virtual line H1, and the left end of fuel tank 210 is disposed on the left of virtual line H2 in the preferred embodiment described with reference to FIG. 9. However, the disposition of fuel tank 210 is not limited to the specific disposition of FIG. 9. The right end of fuel tank 210 may be disposed slightly to the right of virtual line H1, and the left end of fuel tank 210 may be disposed slightly to the left of virtual line H2.

A portion of heavy component 270 is preferably disposed in the range surrounded by virtual lines F1 and F2, upper axis A, and lower axis C in the preferred embodiment described with reference to FIG. 8. However, the disposition of heavy component 270 is not limited to the specific disposition of FIG. 8. It is only necessary that heavy component 270 is disposed in the range surrounded by virtual lines F1 and F2, upper axis A, and lower axis C, in a side view with body frame 110 in the upright state. Therefore, entire heavy component 270 may be disposed within the range surrounded by virtual lines F1 and F2, upper axis A, and lower axis C. A portion of heavy component 270 may be disposed within the range surrounded by virtual lines F1 and F2, upper axis A, and lower axis C.

The configuration of vehicle 100, 100A and 100B and the structures of the components are specifically illustrated in the accompanying drawings in the description of the preferred embodiments. However, any component included in the appended claims may be a structure of the vehicle and of each portion constituting the vehicle.

For example, vehicle 100 preferably includes floor portion 201d forward of seat 180 in a plan view, in the example described above. However, vehicles according to various preferred embodiments of the present invention may be a type in which floor portion 201d is not included, and the rider straddles the seat.

Although link support 111 preferably also defines and functions as a head tube in the example described above, vehicles according to various preferred embodiments of the present invention may include a head tube separate from link support 111.

It is only necessary that the power unit includes an engine, a crankcase, and a transmission case. The crankcase and the transmission case may not be separate, and may be integral. The position of the power unit is not limited to the position illustrated above. It is only necessary that the crankcase is at a position disposed below the upper end of the right front wheel, the upper end of the left front wheel, and the upper end of the rear wheel in the up-down direction of the body frame and between the right and left front wheels and the rear wheel in the front-rear direction of the body frame, with the body frame in the upright state. Preferred embodiments of the present invention also include a case in which a portion of the power unit is disposed not below the upper end of the right front wheel, the upper end of the left front wheel, and the upper end of the rear wheel in the up-down direction of the body frame and not between the right and left front wheels and the rear wheel in the front-rear direction of the body frame. The number of cylinders of the engine is not limited, either.

In the link mechanism according to a preferred embodiment of the present invention, the upper cross member may include a front upper cross member with a portion disposed forward of link support 111 and a rear upper cross member with a portion disposed behind link support 111. The lower cross member may include only a front lower cross member or may include only a rear lower cross member. The link mechanism may include only the upper cross member and the lower cross member, and the link mechanism may also include one or a plurality of cross members disposed between the upper cross member and the lower cross member in the up-down direction of the body frame.

The seat according may include a seating surface of a tandem rider (fellow passenger) in addition to the seating surface of the rider. The position of the seating surface of the tandem rider is not particularly limited.

The present invention can be embodied by a large number of different preferred embodiments. This disclosure should be construed as providing preferred embodiments of the principle of the present invention. A large number of illustrative preferred embodiments are described here with the understanding that the preferred embodiments are not intended to limit the present invention to the preferred embodiments described and/or illustrated here.

Some illustrative preferred embodiments of the present invention are described here. The present invention is not limited to various preferred embodiments described here. The present invention includes any preferred embodiments including equivalent elements, corrections, deletions, combinations (for example, combinations with features across various preferred embodiments), improvements, and/or changes that can be recognized by those skilled in the art based on this disclosure. The limitations of the appended claims should be broadly interpreted based on the terms used in the appended claims, and the limitations should not be limited by the preferred embodiments described in the present description or in the prosecution of the present application. The preferred embodiments should be construed as non-exclusive. For example, the terms "preferably" and "may" are non-exclusive in this disclosure, meaning "preferable, but not limited to this" and "may be, but not limited to this."

The disclosure of Japanese Patent Application No. 2014-017268, filed on Jan. 31, 2014, including the specification, drawings, and abstract is incorporated herein by reference in its entirety.

Various preferred embodiments of the present invention are useful for a vehicle including a left front wheel, a right front wheel, and a rear wheel that tilt in the left-right direction along with a body frame.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame;
   a right front wheel and a left front wheel disposed side by side in a left-right direction of the body frame, the right and the left front wheels being tiltable in the left-right direction along with the body frame;
   a rear wheel tiltable in the left-right direction along with the body frame;
   a seat including a seating surface on which a rider sits;
   a right front wheel support including an upper portion and a lower portion that supports the right front wheel;
   a left front wheel support including an upper portion and a lower portion that supports the left front wheel;
   a link mechanism including:
      a right-side rod that supports the upper portion of the right front wheel support such that the upper portion thereof is turnable around a right axis extending in an up-down direction of the body frame;
      a left-side rod that supports the upper portion of the left front wheel support such that the upper portion thereof is turnable around a left axis which is parallel or substantially parallel to the right axis;
      an upper cross member including a right end portion that supports an upper portion of the right-side rod such that the upper portion thereof is turnable, a left end portion that supports an upper portion of the left-side rod such that the upper portion thereof is turnable, and an intermediate portion that is supported by the body frame so as to be turnable around an upper axis extending in a front-rear direction of the body frame; and
      a lower cross member including a right end portion that supports a lower portion of the right-side rod such that the lower portion thereof is turnable, a left end portion that supports a lower portion of the left-side rod such that the lower portion thereof is turnable, and an intermediate portion that is supported by the body frame so as to be turnable around a lower axis which is parallel or substantially parallel to the upper axis;
   a power unit including: a crankcase that houses a crankshaft; and a transmission case that houses a transmission, the power unit generating a driving force of the rear wheel;
   a fuel tank that stores fuel to be supplied to the power unit; and
   a steering shaft supported by the body frame so as to be turnable, the steering shaft changing a direction of the left front wheel and the right front wheel; wherein
   the link mechanism is disposed above the right front wheel and the left front wheel in a side view of the body frame in an upright state;
   an angle defined by a vertical line and a virtual line that is perpendicular or substantially perpendicular to the upper axis and the lower axis is smaller than an angle defined by a turning axis of the steering shaft and the vertical line in the side view of the body frame in the upright state;
   the crankcase is disposed below upper ends of the right front wheel, the left front wheel, and the rear wheel in an up-down direction of the body frame and between the right and the left front wheels, and the rear wheel in the front-rear direction of the body frame when the body frame is in the upright state;
   the crankcase and the transmission case are disposed closer to the rear wheel than to the right and the left front wheels in the front-rear direction of the body frame when the body frame is in the upright state;
   the seating surface is disposed between a front end of the crankcase and a rear end of the rear wheel, and between a front end of the transmission case and the rear end of the rear wheel in the front-rear direction of the body frame when the body frame is in the upright state;
   the fuel tank is disposed between an extension line of the upper axis and an extension line of the lower axis in the up-down direction of the body frame when the body frame is in the upright state, and is disposed between a first center and a second center, the first center located between a third center and right and left front wheel ground contacting portions, the second center located between the third center and a rear wheel ground contacting portion, the third center located between the right and the left front wheel ground contacting portions and the rear wheel ground contacting portion in the front-rear direction of the body frame when the body frame is in the upright state, the right front wheel ground contacting portion, the left front wheel ground contacting portion, and the rear wheel ground contacting portion being where the right front wheel, the left front wheel, and the rear wheel contact the ground, respectively; and
   a length of the fuel tank in the front-rear direction of the body frame when the body frame is in the upright state is shorter than a distance between the second center and the third center in the front-rear direction of the body frame when the body frame is in the upright state.

2. The vehicle according to claim 1, wherein a left end of the fuel tank is disposed on a left of a center between a center of the upper cross member and a center of the lower cross member and left ends of the upper cross member and the lower cross member; and a right end of the fuel tank is disposed on a right of the center between the center of the upper cross member and the center of the lower cross member and right ends of the upper cross member and the lower cross member in the left-right direction of the body frame when the body frame is in the upright state.

3. The vehicle according to claim 1, wherein a rear end of the fuel tank is disposed forward of the third center which is located between the left and the right front wheel ground contacting portions and the rear wheel ground contacting portion in the front-rear direction of the body frame when the body frame is in the upright state.

4. The vehicle according to claim 1, wherein a front end of the fuel tank is disposed behind the third center which is located between the left and the right front wheel ground contacting portions and the rear wheel ground contacting portion in the front-rear direction of the body frame when the body frame is in the upright state.

5. The vehicle according to claim 1, wherein the fuel tank overlaps with the third center which is located between the left and the right front wheel ground contacting portions and the rear wheel ground contacting portion in the front-rear direction of the body frame when the body frame is in the upright state.

6. The vehicle according to claim 1, wherein an upper end of the fuel tank is disposed above a lower end of the lower cross member in the up-down direction of the body frame.

7. The vehicle according to claim 1, further comprising a component including a battery or a brake pressure controller; wherein the component is disposed between the extension line of the upper axis and the extension line of the lower axis in the up-down direction of the body frame when the body frame is in the upright state, and is disposed between the first center and the second center in the front-rear direction of the body frame when the body frame is in the upright state.

8. The vehicle according to claim 1, wherein the first center, the second center, and the third center are midpoints.

* * * * *